(12) United States Patent
Fuhr et al.

(10) Patent No.: US 8,999,538 B2
(45) Date of Patent: Apr. 7, 2015

(54) BATTERY MODULE WITH SEALED VENT CHAMBER

(75) Inventors: Jason D. Fuhr, Sussex, WI (US); Dale Trester, Milwaukee, WI (US); Gary Houchin-Miller, Fox Point, WI (US); Chris Bonin, South Milwaukee, WI (US); Anthony C. Pacheco, Thiensville, WI (US)

(73) Assignee: Johnson Controls—SAFT Advanced Power Solutions LLC, Wilmington, DE (US)

( * ) Notice: Subject to any disclaimer, the term of this patent is extended or adjusted under 35 U.S.C. 154(b) by 845 days.

(21) Appl. No.: 13/058,324

(22) PCT Filed: Aug. 13, 2009

(86) PCT No.: PCT/US2009/053697
§ 371 (c)(1),
(2), (4) Date: Feb. 9, 2011

(87) PCT Pub. No.: WO2010/019764
PCT Pub. Date: Feb. 18, 2010

(65) Prior Publication Data
US 2011/0135975 A1    Jun. 9, 2011

Related U.S. Application Data

(60) Provisional application No. 61/088,879, filed on Aug. 14, 2008, provisional application No. 61/101,985, filed on Oct. 1, 2008, provisional application No. 61/143,707, filed on Jan. 9, 2009, provisional (Continued)

(51) Int. Cl.
*H01M 2/08* (2006.01)
*H01M 2/10* (2006.01)
*H01M 2/12* (2006.01)

(52) U.S. Cl.
CPC .............. *H01M 2/1077* (2013.01); *H01M 2/08* (2013.01); *H01M 2/1094* (2013.01); *H01M 2/1211* (2013.01)

(58) Field of Classification Search
None
See application file for complete search history.

(56) References Cited

U.S. PATENT DOCUMENTS 2,042,806 A   6/1936   Schulte
2,416,079 A   2/1947   Anthony
(Continued)

FOREIGN PATENT DOCUMENTS

CN   1992392 A    7/2007
EP   0 607 675 B1   9/1996
(Continued)

OTHER PUBLICATIONS

Office Action for European Application No. 07836697.8, mail date Mar. 7, 2011, 11 pages.
(Continued)

*Primary Examiner* — Jonathan Crepeau
(74) *Attorney, Agent, or Firm* — Fletcher Yoder, P.C.

(57) ABSTRACT

A battery module having sealed vent chamber includes a plurality of electrochemical cells each having a vent at an end thereof. The module also includes a structure defining a chamber and comprising a plurality of sockets, each socket configured to receive one of the plurality of electrochemical cells such that the vents of the electrochemical cells are located in the chamber. The module further includes a seal provided between at least one of the electrochemical cells and its associated socket. At least a portion of the seal is deformable such that gases released from the electrochemical cells into the chamber compress the deformable portion of the seal against the electrochemical cells to seal the gases in the chamber.

25 Claims, 22 Drawing Sheets

Related U.S. Application Data application No. 61/146,994, filed on Jan. 23, 2009, provisional application No. 61/178,428, filed on May 14, 2009, provisional application No. 61/186,277, filed on Jun. 11, 2009.

(56) References Cited

U.S. PATENT DOCUMENTS

| | | | |
|---|---|---|---|
| 3,338,452 A | 8/1967 | Oakley et al. | |
| 4,189,473 A | 2/1980 | Cole et al. | |
| 4,554,221 A | 11/1985 | Schmid | |
| 4,957,829 A | 9/1990 | Holl | |
| 5,336,570 A | 8/1994 | Dodge, Jr. | |
| 5,606,238 A | 2/1997 | Spellman et al. | |
| 5,866,276 A | 2/1999 | Ogami et al. | |
| 5,879,833 A | 3/1999 | Yoshii et al. | |
| 6,001,501 A | 12/1999 | Collie | |
| 6,106,972 A | 8/2000 | Kokubo et al. | |
| 6,265,091 B1 | 7/2001 | Pierson et al. | |
| 6,379,831 B1 | 4/2002 | Draper et al. | |
| 6,379,837 B1* | 4/2002 | Takahashi et al. | 429/151 |
| 6,410,184 B1 | 6/2002 | Horiuchi et al. | |
| 6,410,185 B1 | 6/2002 | Takahashi et al. | |
| 6,461,757 B1 | 10/2002 | Sasayama et al. | |
| 6,465,123 B1 | 10/2002 | Baumann et al. | |
| 6,472,098 B1 | 10/2002 | Sawada et al. | |
| 6,541,154 B2 | 4/2003 | Oogami et al. | |
| 6,558,835 B1 | 5/2003 | Kurisu et al. | |
| 6,579,640 B1 | 6/2003 | Nagase et al. | |
| 6,656,632 B2 | 12/2003 | Asaka et al. | |
| 6,767,666 B2 | 7/2004 | Nemoto et al. | |
| 6,858,345 B2 | 2/2005 | Amine et al. | |
| 6,896,995 B2 | 5/2005 | Saito | |
| 6,923,837 B2 | 8/2005 | Longhi, Jr. et al. | |
| 6,932,651 B2 | 8/2005 | Mita et al. | |
| 6,953,638 B2 | 10/2005 | Inui et al. | |
| 7,014,949 B2 | 3/2006 | Kanai et al. | |
| 7,094,496 B2 | 8/2006 | Rodriguez et al. | |
| 7,129,001 B2 | 10/2006 | Munenaga et al. | |
| 7,147,963 B2 | 12/2006 | Kimoto et al. | |
| 7,160,643 B2 | 1/2007 | Kunimoto et al. | |
| 7,189,474 B2 | 3/2007 | Hamada et al. | |
| 7,270,576 B2 | 9/2007 | Kim et al. | |
| 7,351,493 B2 | 4/2008 | Uemoto et al. | |
| 7,531,270 B2 | 5/2009 | Buck et al. | |
| 7,875,375 B2 | 1/2011 | Hamada et al. | |
| 8,133,602 B2* | 3/2012 | Kim | 429/56 |
| 2001/0046624 A1 | 11/2001 | Goto et al. | |
| 2003/0059676 A1 | 3/2003 | Ruiz Rodriguez et al. | |
| 2004/0038123 A1 | 2/2004 | Hisamitsu et al. | |
| 2004/0175612 A1 | 9/2004 | Conti | |
| 2005/0048365 A1 | 3/2005 | Miyahisa et al. | |
| 2005/0079408 A1 | 4/2005 | Hirano | |
| 2005/0100783 A1 | 5/2005 | Ro et al. | |
| 2005/0170239 A1 | 8/2005 | Uemoto et al. | |
| 2005/0170240 A1 | 8/2005 | German et al. | |
| 2005/0174092 A1 | 8/2005 | Dougherty et al. | |
| 2005/0287427 A1 | 12/2005 | Kim et al. | |
| 2006/0026822 A1 | 2/2006 | Seman, Jr. et al. | |
| 2006/0040173 A1 | 2/2006 | Shimamura et al. | |
| 2006/0063067 A1 | 3/2006 | Kim | |
| 2006/0073378 A1 | 4/2006 | Hamery et al. | |
| 2006/0073379 A1 | 4/2006 | Kim et al. | |
| 2006/0078789 A1 | 4/2006 | Wegner | |
| 2006/0162149 A1 | 7/2006 | Ha et al. | |
| 2006/0177734 A1 | 8/2006 | Yao | |
| 2006/0204840 A1 | 9/2006 | Jeon et al. | |
| 2006/0216582 A1 | 9/2006 | Lee et al. | |
| 2006/0216583 A1 | 9/2006 | Lee et al. | |
| 2006/0234119 A1 | 10/2006 | Kruger et al. | |
| 2006/0246350 A1 | 11/2006 | Takayama et al. | |
| 2007/0015050 A1 | 1/2007 | Jung et al. | |
| 2007/0026303 A1 | 2/2007 | Jeon et al. | |
| 2007/0026305 A1 | 2/2007 | Jeon et al. | |
| 2007/0026306 A1 | 2/2007 | Lee et al. | |
| 2007/0026739 A1 | 2/2007 | Kim et al. | |
| 2007/0037051 A1 | 2/2007 | Kim et al. | |
| 2008/0160395 A1 | 7/2008 | Okada et al. | |
| 2008/0182162 A1* | 7/2008 | Kim | 429/99 |
| 2009/0111015 A1 | 4/2009 | Wood et al. | |
| 2009/0148766 A1 | 6/2009 | Shen et al. | |
| 2009/0181288 A1* | 7/2009 | Sato | 429/57 |
| 2009/0297941 A1 | 12/2009 | Shen et al. | |
| 2010/0092849 A1 | 4/2010 | Wood et al. | |
| 2010/0183904 A1 | 7/2010 | Muis | |

FOREIGN PATENT DOCUMENTS

| | | |
|---|---|---|
| EP | 1 109 237 A1 | 6/2001 |
| EP | 1 213 784 A2 | 6/2002 |
| EP | 1503442 A2 | 2/2005 |
| EP | 1 250 720 B1 | 5/2006 |
| EP | 1 786 051 A1 | 5/2007 |
| EP | 1775784 B1 | 9/2010 |
| FR | 2058740 A5 | 5/1971 |
| FR | 2585185 A1 | 1/1987 |
| GB | 2 136 629 A | 9/1984 |
| JP | 2003 308823 | 10/2003 |
| JP | 2007-012487 | 1/2007 |
| JP | 2007-280831 | 10/2007 |
| WO | WO 2007/134198 A1 | 11/2007 |
| WO | WO 2008/021230 A2 | 2/2008 |
| WO | WO 2008/027343 A1 | 3/2008 |
| WO | WO 2008/074034 A1 | 6/2008 |
| WO | WO 2008/086417 A2 | 7/2008 |
| WO | WO 2008/098193 A2 | 8/2008 |
| WO | WO 2009/016476 A2 | 2/2009 |
| WO | WO 2010/019764 A2 | 2/2010 |
| WO | WO 2010/085636 A2 | 7/2010 |

OTHER PUBLICATIONS

Communication under Rule 71(3) EPC for European Application No. 07783619.5, dated Jan. 31, 2011, 61 pages.
European Search Report for European Application No. 09012377.9, dated Dec. 22, 2009, 10 pages.
International Preliminary Report on Patentability for International Application No. PCT/IB2008/001984, dated Feb. 2, 2010, 6 pages.
International Preliminary Report on Patentability, Written Opinion of the International Searching Authority and International Search Report for International Application No. PCT/US2007/017785, dated Mar. 3, 2008, 15 pages.
International Search Report for International Application No. PCT/IB2008/001984, dated Feb. 4, 2009, 2 pages.
International Search Report for International Application No. PCT/US2007/068716, dated Oct. 17, 2007, 5 pages.
International Search Report for International Application No. PCT/US2010/021791, dated Aug. 13, 2010, 3 pages.
Notice of deficiencies of European Application No. 07836697.8, dated Aug. 31, 2009, 2 pages.
Office Action for Chinese Application No. 200780025271.0 with English translation, dated Sep. 8, 2010, 4 pages.
Office Action for European Application No. 07783619.5, dated Jul. 29, 2009, 4 pages.
Office Action for European Application No. 07836697.8, dated Feb. 17, 2010, 3 pages.
Office Action for European Application No. 09012377.9, dated Jun. 1, 2010, 1 page.
Office Action for European Application No. 09012377.9, dated Oct. 7, 2010, 3 pages.
Office Action of Chinese Patent Application No. 200780029735.5 with English translation, dated Jul. 25, 2010, 10 pages.
Response to Office Action for European Application No. 07783619.5, dated Feb. 5, 2010, 9 pages.
Response to Office Action for European Application No. 07836697.8, dated Jan. 6, 2010, 6 pages.
Response to Office Action for European Application No. 07836697.8, dated Jun. 25, 2010, 9 pages.
Response to Office Action for European Application No. 09012377.9, dated Feb. 10, 2011, 5 pages.

(56) References Cited

OTHER PUBLICATIONS

Response to Office Action for European Application No. 09012377.9, dated Sep. 28, 2010, 14 pages.
Written Opinion of International Application No. PCT/US2007/068716, dated Oct. 17, 2007, 6 pages.
International Search Report and Written Opinion for International Application No. PCT/US2009/053697, date of completion Mar. 19, 2010, 6 pages.
Office Action for U.S. Appl. No. 13/186,314, dated Jan. 19, 2012, 15 pages.
Office Action for U.S. Appl. No. 13/087,262, dated Jan. 19, 2012, 7 pages.
Office Action for U.S. Appl. No. 12/263,123, dated Jun. 6, 2012, 10 pages.
Extended European Search Report for EP Application No. 09807282.0 dated Sep. 13, 2013; 5 pgs.

\* cited by examiner

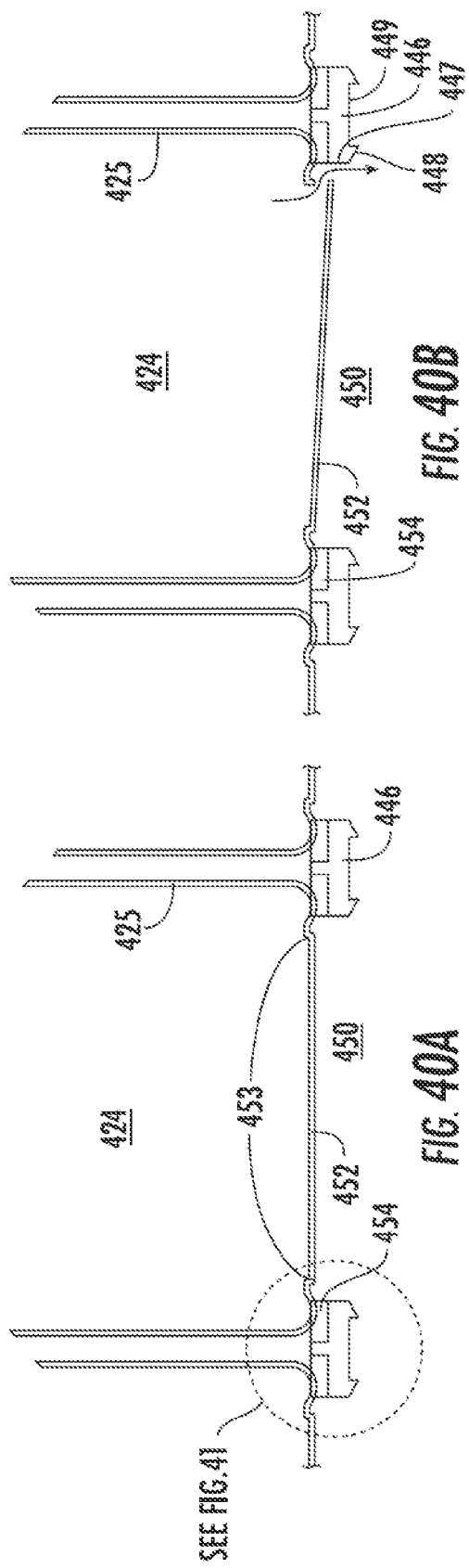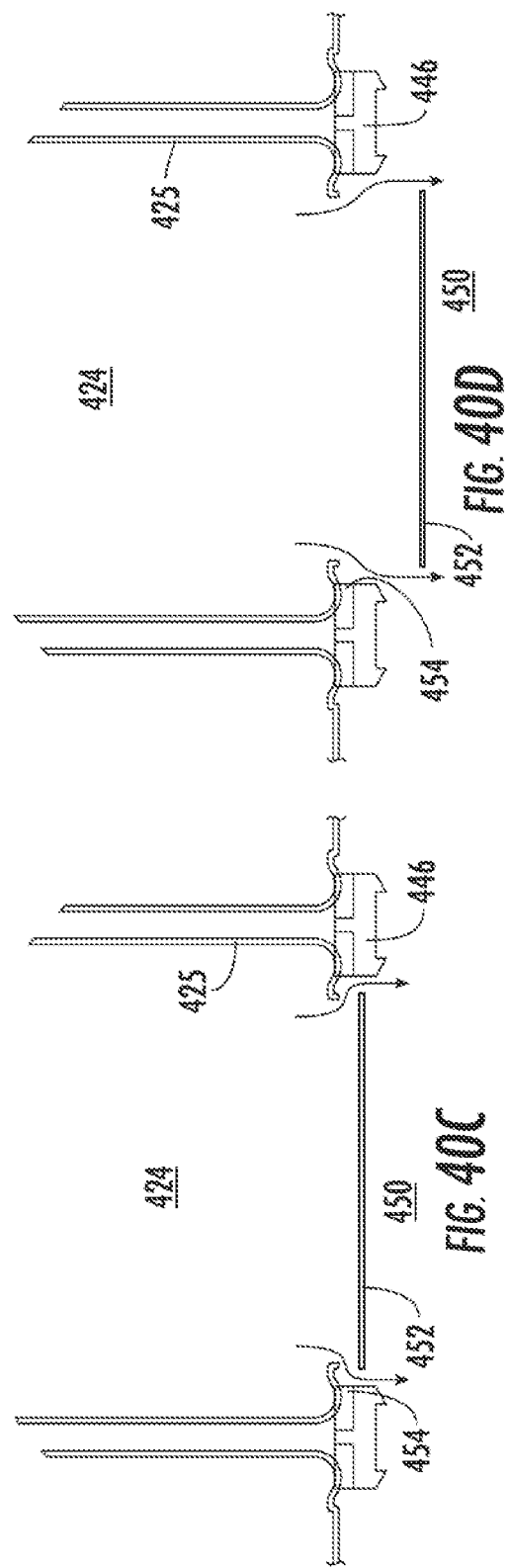

BATTERY MODULE WITH SEALED VENT CHAMBER

CROSS-REFERENCE TO RELATED PATENT APPLICATIONS

This application is a U.S. National Phase Application claiming the benefit of and priority to International Application No. PCT/US2009/053697, filed Aug. 13, 2009, which claims the benefit of and priority to U.S. Provisional Patent Application No. 61/186,277, filed Jun. 11, 2009; U.S. Provisional Patent Application No. 61/178,428, filed May 14, 2009; U.S. Provisional Patent Application No. 61/146,994, filed Jan. 23, 2009; U.S. Provisional Patent Application No. 61/143,707, filed Jan. 9, 2009; U.S. Provisional Patent Application No. 61/101,985, filed Oct. 1, 2008; and U.S. Provisional Patent Application No. 61/088,879, filed Aug. 14, 2008.

The disclosures of the following patent applications are incorporated by reference in their entirety: International Application No. PCT/US2009/053697; U.S. Provisional Patent Application No. 61/186,277; U.S. Provisional Patent Application No. 61/178,428; U.S. Provisional Patent Application No. 61/146,994; U.S. Provisional Patent Application No. 61/143, 707; U.S. Provisional Patent Application No. 61/101,985; and U.S. Provisional Patent Application No. 61/088,879.

BACKGROUND

The present application relates generally to the field of batteries and battery systems. More specifically, the present application relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles") may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case of certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

It is generally known that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It would be desirable to provide an improved battery module and/or system for use in electric vehicles that addresses one or more of the challenges associated with NiMH and/or lithium-ion battery systems used in such vehicles. It also would be desirable to provide a battery module and/or system that includes any one or more of the advantageous features that will be apparent from a review of the present disclosure.

SUMMARY

According to an exemplary embodiment, a battery module having sealed vent chamber includes a plurality of electrochemical cells each having a vent at an end thereof. The module also includes a structure defining a chamber and comprising a plurality of sockets, each socket configured to receive one of the plurality of electrochemical cells such that the vents of the electrochemical cells are located in the chamber. The module further includes a seal provided between at least one of the electrochemical cells and its associated socket. At least a portion of the seal is deformable such that gases released from the electrochemical cells into the chamber compress the deformable portion of the seal against the electrochemical cells to seal the gases in the chamber.

BRIEF DESCRIPTION OF THE DRAWINGS

FIGS. 40A-40D are cross-section views of a portion of a battery module showing a vent as it deploys according to an exemplary embodiment.

DETAILED DESCRIPTION

Figure 1:
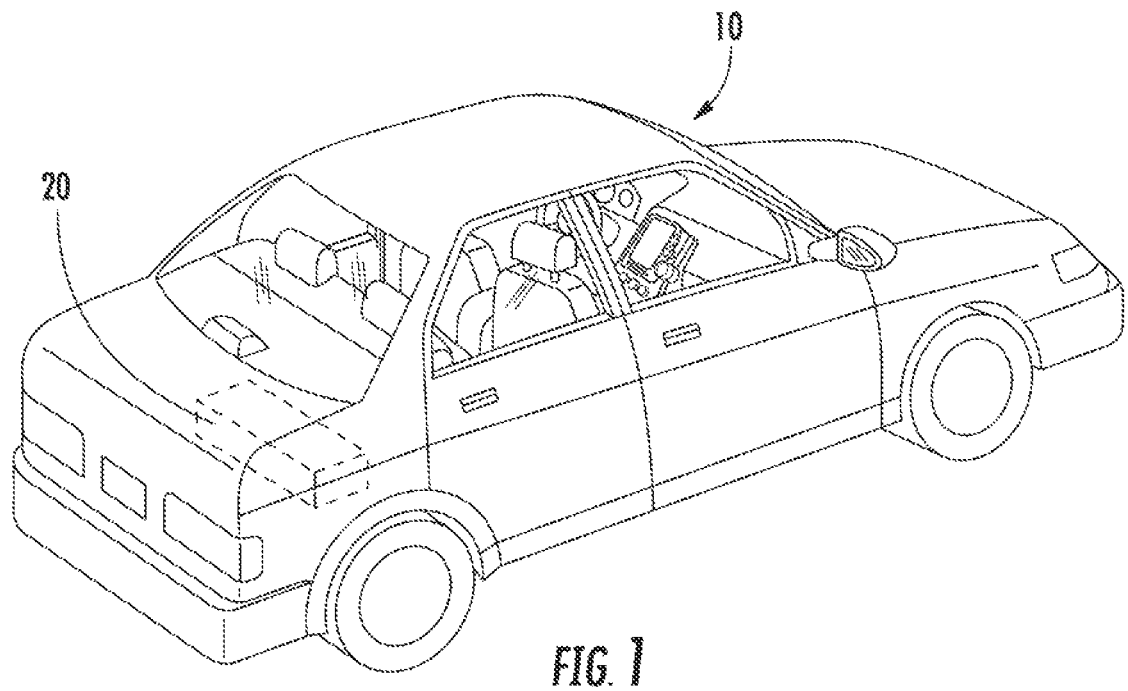
FIG. 1 is a perspective view of a vehicle including a battery module according to an exemplary embodiment.

FIG. 1 is a perspective view of a vehicle 10 in the form of an automobile (e.g., a car) having a battery system 20 for providing all or a portion of the motive power for the vehicle 10. Such a vehicle 10 can be an electric vehicle (EV), a hybrid electric vehicle (HEV), a plug-in hybrid electric vehicle (PHEV), or other type of vehicle using electric power for propulsion (collectively referred to as "electric vehicles").

Although the vehicle 10 is illustrated as a car in FIG. 1, the type of vehicle may differ according to other exemplary embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Although the battery system 20 is illustrated in FIG. 1 as being positioned in the trunk or rear of the vehicle, according to other exemplary embodiments, the location of the battery system 20 may differ. For example, the position of the battery system 20 may be selected based on the available space within a vehicle, the desired weight balance of the vehicle, the location of other components used with the battery system 20 (e.g., battery management systems, vents, or cooling devices, etc.), and a variety of other considerations.

Figure 2:
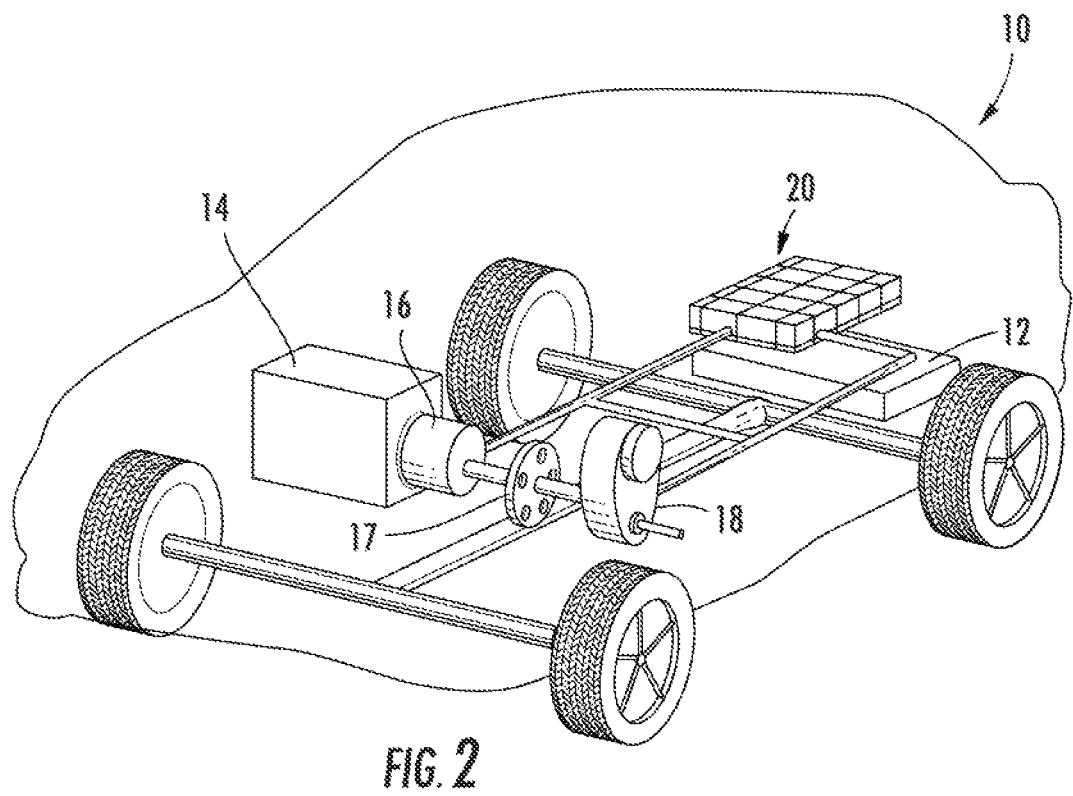
FIG. 2 is a cutaway schematic view of a vehicle including a battery module according to an exemplary embodiment.

FIG. 2 illustrates a cutaway schematic view of a vehicle 10 provided in the form of an HEV according to an exemplary embodiment. A battery system 20 is provided toward the rear of the vehicle 10 proximate a fuel tank 12 (the battery system 20 may be provided immediately adjacent the fuel tank 12 or may be provided in a separate compartment in the rear of the vehicle 10 (e.g., a trunk) or may be provided elsewhere in the vehicle 10). An internal combustion engine 14 is provided for times when the vehicle 10 utilizes gasoline power to propel the vehicle 10. An electric motor 16, a power split device 17, and a generator 18 are also provided as part of the vehicle drive system.

Such a vehicle 10 may be powered or driven by just the battery system 20, by just the engine 14, or by both the battery system 20 and the engine 14. It should be noted that other types of vehicles and configurations for the vehicle drive system may be used according to other exemplary embodiments, and that the schematic illustration of FIG. 2 should not be considered to limit the scope of the subject matter described in the present application.

According to various exemplary embodiments, the size, shape, and location of the battery system 20, the type of vehicle 10, the type of vehicle technology (e.g., EV, HEV, PHEV, etc.), and the battery chemistry, among other features, may differ from those shown or described.

Figure 3:
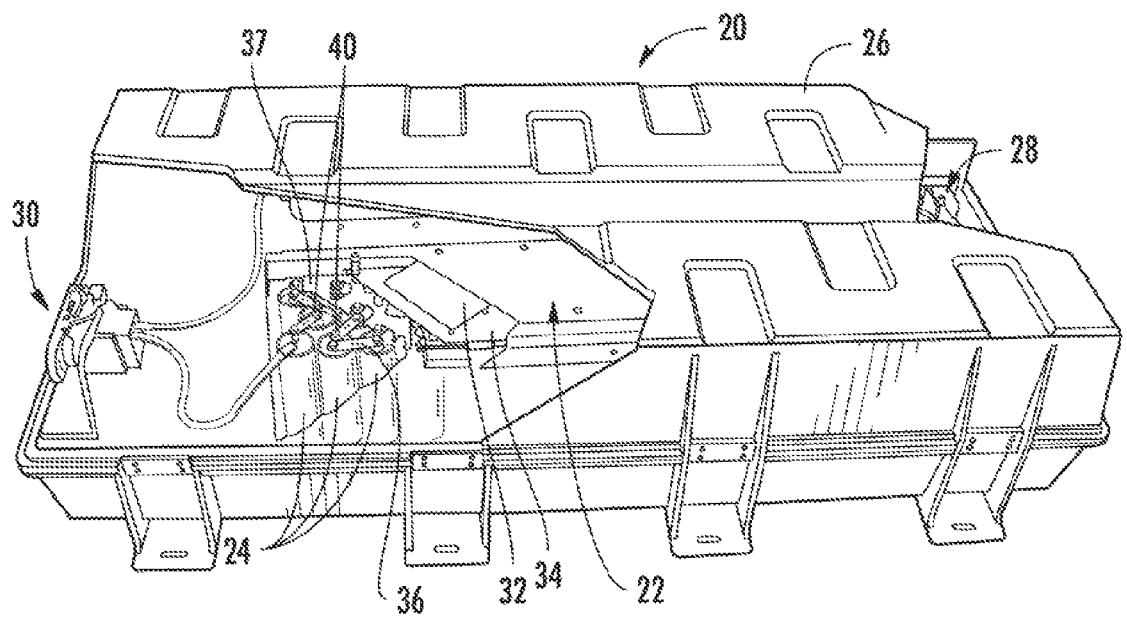
FIGS. 3-4 are partial cutaway views of a battery system according to an exemplary embodiment.
Figure 4:
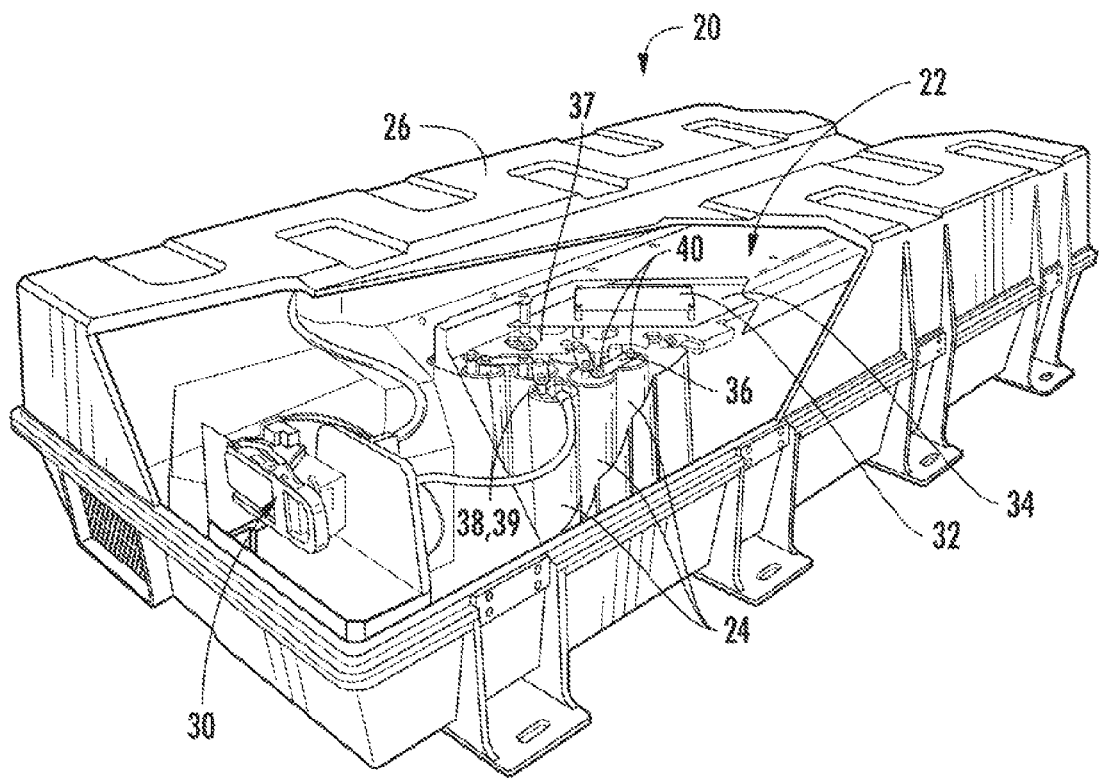
Figure 5:
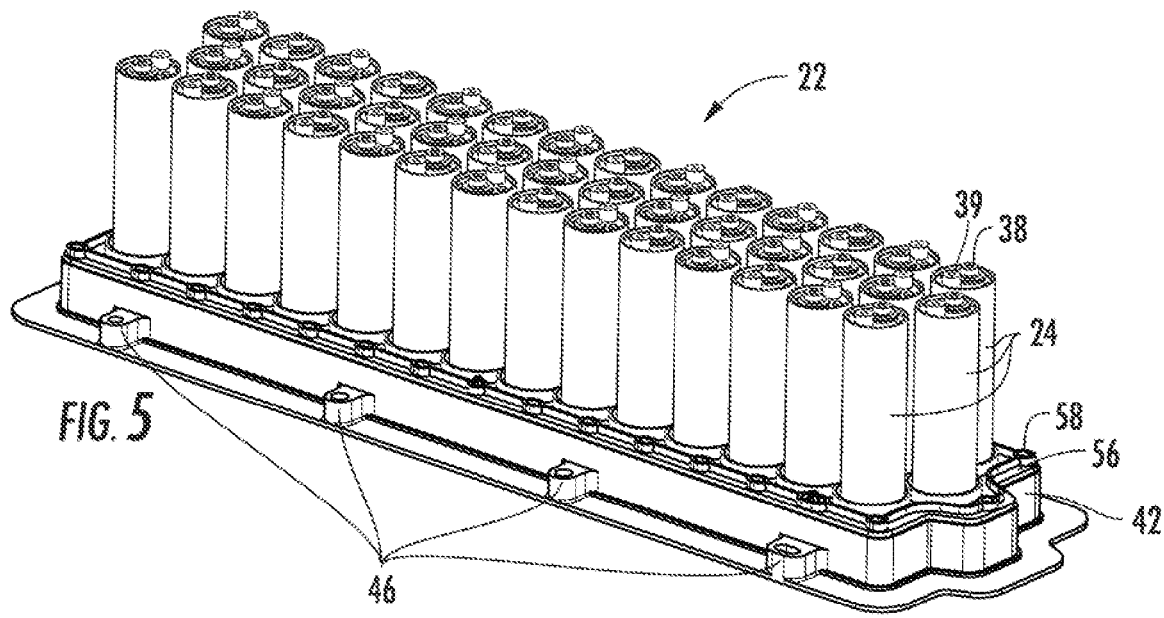
FIGS. 5-6 are isometric views of a portion of a battery module for use in a battery system according to an exemplary embodiment.
Figure 6:
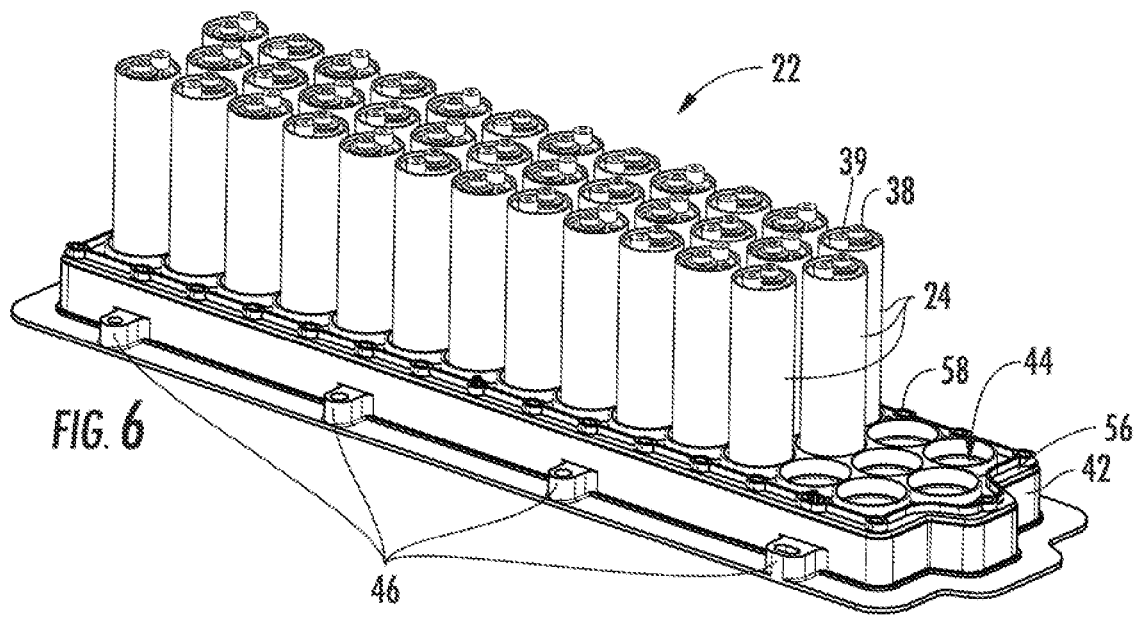
Figure 7:
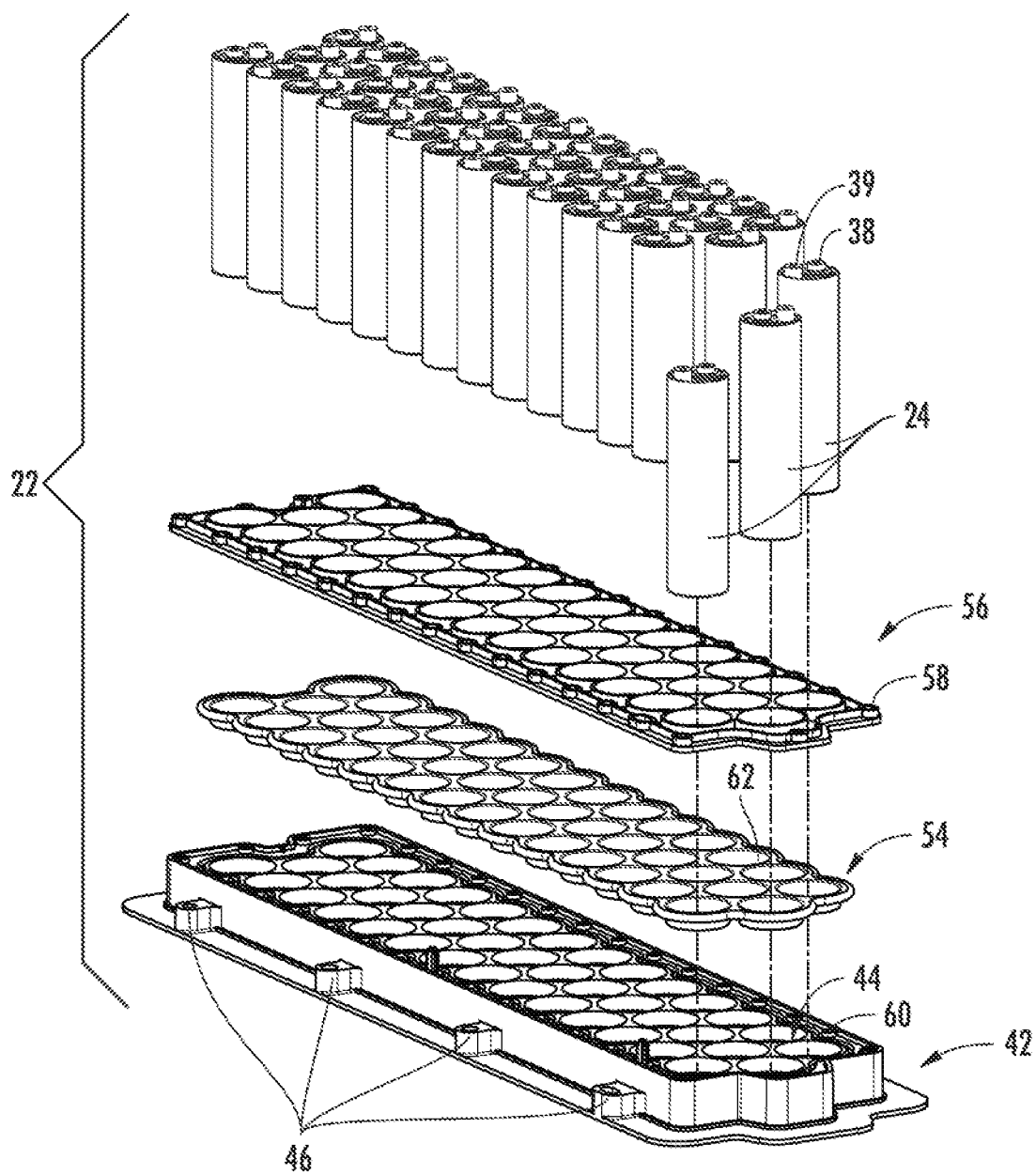
FIG. 7 is a partial exploded view of the battery module of FIG. 5.
Figure 8:
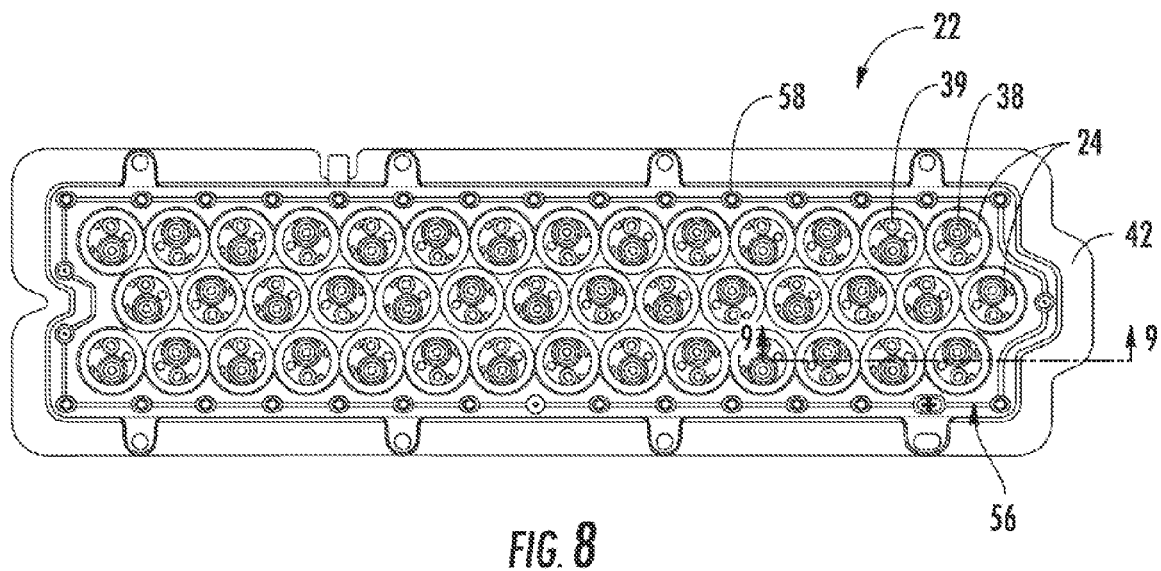
FIG. 8 is a top view of the battery module of FIG. 5.

Referring now to FIGS. 3-4, partial cutaway views of a battery system 20 are shown according to an exemplary embodiment. According to an exemplary embodiment, the battery system 20 is responsible for packaging or containing electrochemical batteries or cells 24, connecting the electrochemical cells 24 to each other and/or to other components of the vehicle electrical system, and regulating the electrochemical cells 24 and other features of the battery system 20. For example, the battery system 20 may include features that are responsible for monitoring and controlling the electrical performance of the battery system 20, managing the thermal behavior of the battery system 20, containing and/or routing of effluent (e.g., gases that may be vented from a cell 24), and other aspects of the battery system 20.

According to the exemplary embodiment as shown in FIGS. 3-4, the battery system 20 includes a cover or housing 26 that encloses the components of the battery system 20. Included in the battery system are two battery modules 22 located side-by-side inside the housing 26. According to other exemplary embodiments, a different number of battery modules 22 may be included in the battery system 20, depending on the desired power and other characteristics of the battery system 20. According to other exemplary embodiments, the battery modules 22 may be located in a configuration other than side-by-side (e.g., end-to-end, etc.).

As shown in FIGS. 3-4, the battery system 20 also includes a high voltage connector 28 located at one end of the battery system 20 and a service disconnect 30 located at a second end of the battery system 20 opposite the first end according to an exemplary embodiment. The high voltage connector 28 connects the battery system 20 to a vehicle 10. The service disconnect 30, when actuated by a user, disconnects the two individual battery modules 22 from one another, thus lowering the overall voltage potential of the battery system 20 by half to allow the user to service the battery system 20.

According to an exemplary embodiment, each battery module 22 includes a plurality of cell supervisory controllers (CSCs) 32 to monitor and regulate the electrochemical cells 24 as needed. According to other various exemplary embodiments, the number of CSCs 32 may differ. The CSCs 32 are mounted on a member shown as a trace board 34 (e.g., a printed circuit board). The trace board 34 includes the necessary wiring to connect the CSCs 32 to the individual electrochemical cells 24 and to connect the CSCs 32 to the battery management system (not shown) of the battery system 20. The trace board 34 also includes various connectors to make these connections possible (e.g., temperature connectors, electrical connectors, voltage connectors, etc.).

Still referring to FIGS. 3-4, each of the battery modules 22 includes a plurality of electrochemical cells 24 (e.g., lithium-ion cells, nickel-metal-hydride cells, lithium polymer cells, etc., or other types of electrochemical cells now known or hereafter developed). According to an exemplary embodiment, the electrochemical cells 24 are generally cylindrical lithium-ion cells configured to store an electrical charge. According to other exemplary embodiments, the electrochemical cells 24 could have other physical configurations (e.g., oval, prismatic, polygonal, etc.). The capacity, size, design, and other features of the electrochemical cells 24 may also differ from those shown according to other exemplary embodiments.

Each of the electrochemical cells 24 are electrically coupled to one or more other electrochemical cells 24 or other components of the battery system 20 using connectors provided in the form of bus bars 36 or similar elements. According to an exemplary embodiment, the bus bars 36 are housed or contained in bus bar holders 37. According to an exemplary embodiment, the bus bars 36 are constructed from a conductive material such as copper (or copper alloy), aluminum (or aluminum alloy), or other suitable material. According to an exemplary embodiment, the bus bars 36 may be coupled to terminals 38, 39 of the electrochemical cells 24 by welding (e.g., resistance welding) or through the use of fasteners 40 (e.g., a bolt or screw may be received in a hole at an end of the bus bar 36 and screwed into a threaded hole in the terminal 38, 39).

Referring now to FIGS. 5-11, a portion of a battery module 22 for use in a battery system 20 is shown according to an exemplary embodiment. The battery module 22 includes a plurality of electrochemical cells 24 provided in a first member or tray 42 (e.g., structure, housing, etc.). Although illustrated in FIG. 5 as having a particular number of electrochemical cells 24 (i.e., three rows of electrochemical cells arranged such that 14 electrochemical cells are arranged in each row, for a total of 42 electrochemical cells), it should be noted that according to other exemplary embodiments, a different number and/or arrangement of electrochemical cells 24 may be used in the battery module 22 depending on any of a variety of considerations (e.g., the desired power for the battery module 22, the available space within which the battery module 22 must fit, etc.).

According to an exemplary embodiment, the tray 42 receives the individual electrochemical cells 24 in the proper orientation for assembling the battery module 22. According to an exemplary embodiment, the tray 42 may also include features to provide spacing of the cells away from the bottom of the tray and/or from adjacent cells. For example, according to an exemplary embodiment, the trays may include a series of features shown as sockets 44 (e.g., openings, apertures, etc.) to locate and hold the electrochemical cells 24 in position above the bottom of the tray 42.

As shown in FIGS. 5-8, according to another exemplary embodiment, the tray 42 may also include features shown as bosses 46 that are intended to aid in the retention of a housing or cover (not shown) to enclose and/or retain the plurality of cells 24. According to another exemplary embodiment, the bosses 46 may also aid in securing the tray 42 to the vehicle. According to an exemplary embodiment, the tray 42 may be made of a polymeric material or other suitable material (e.g., electrically insulated material).

Figure 9:
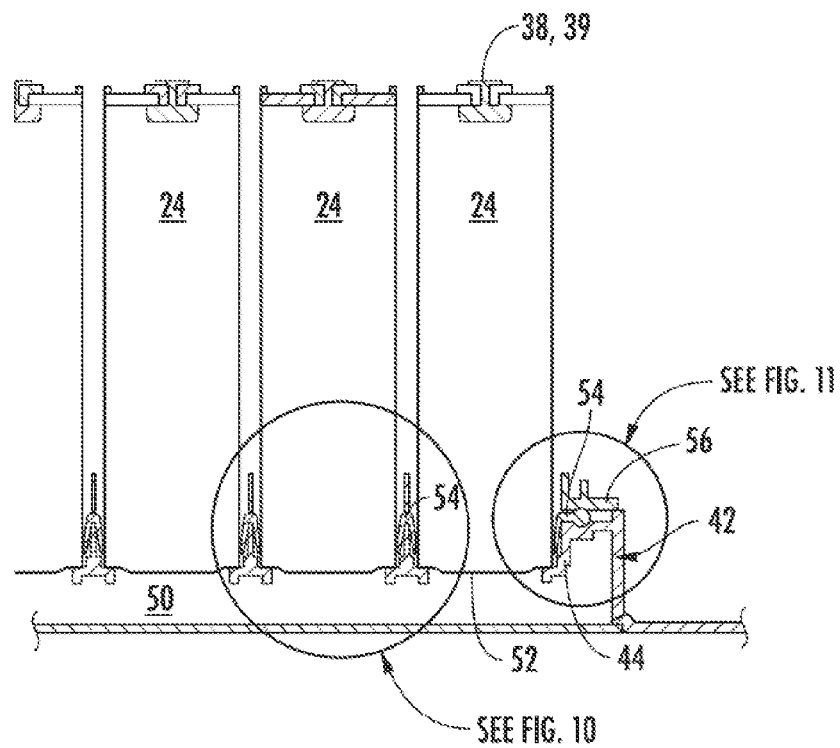
FIG. 9 is a cross-section view of a portion of the battery module of FIG. 8 taken along line 9-9 of FIG. 8.
Figure 10:
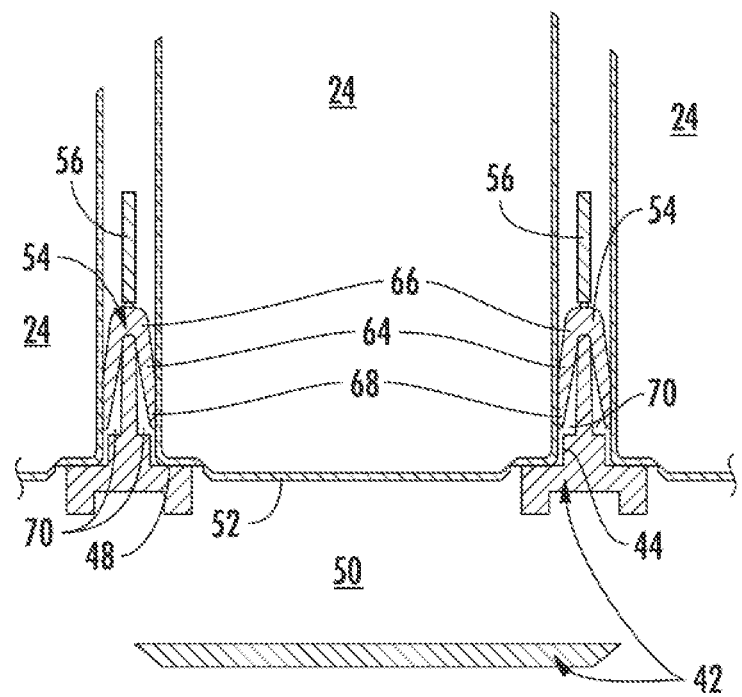
FIG. 10 is a detail view of a portion of the battery module of FIG. 9.

According to an exemplary embodiment, the sockets 44 of the tray 42 are configured to receive (e.g., retain, hold, position, etc.) a lower end or portion of the individual electrochemical cells 24. According to an exemplary embodiment, the sockets 44 are generally cylindrical openings having at least one step or surface 48 (e.g., as shown in FIG. 10) configured to receive the lower portion of the electrochemical cell 24. According to other exemplary embodiments, the openings of the sockets 44 may have other shapes to receive cells of different shapes (e.g., prismatic, oval, etc.). The lower steps or surface 48 of the socket 44 positions the electrochemical cell 24 at a top portion of an airspace or chamber 50 defined by the tray 42 (e.g., as shown in FIG. 9). The chamber 50 is configured to receive gases and/or effluent that may be vented by the electrochemical cells 24 through a vent feature or vent device (e.g., vent 52 as shown in FIG. 10) of the electrochemical cell 24.

Referring now to FIGS. 7-11, the battery module 22 may also include a member shown as a gasket or seal 54. According to an exemplary embodiment, the seal 54 is configured to aid in sealing the lower portions of the electrochemical cells 24 in the tray 42 to help retain any gases vented from the electrochemical cells 24 into the chamber 50. According to an exemplary embodiment, the seal 54 is provided adjacent a top surface of the tray 42. According to an exemplary embodiment, the seal 54 may be constructed from a pliable, non-conductive material such as silicone. According to another exemplary embodiment, the seal 54 may be die cut from a silicone sheet or may be a molded silicone member (e.g., made by an injection molding process).

According to an exemplary embodiment, a member (fixture, device, plate, retainer, etc.) shown as a clamping plate 56 may be provided above the seal 54 in order to keep the seal 54 in place in relation to the tray 42. The clamping plate 56 may be coupled to the tray 42, for example, by threaded fasteners (not shown) that extend through holes 58 in the clamping plate 56 and are received by threaded holes 60 in the tray 42. According to another exemplary embodiment, the clamping plate 56 may be coupled to the tray 42 via a snap fit.

According to an exemplary embodiment, the seal 54 includes a plurality of openings 62 that align with the plurality of sockets 44 of the tray 42. As shown in FIG. 10, each of the openings 62 of the seal 54 comprise a lip portion or edge portion 64 (e.g., a deformable extension) provided in contact with an electrochemical cell 24. According to an exemplary embodiment, the edge portion 64 of the seal 54 is angled in toward the electrochemical cell 24 to provide an interference fit with the electrochemical cell 24 in order to aid in sealing the chamber 50.

According to an exemplary embodiment, the edge portion 64 of the seal 54 is thinner than the rest of the seal 54, giving the edge portion flexibility to conform to the outer diameter of the electrochemical cell 24 in order to aid in sealing in the electrochemical cell 24. According to another exemplary embodiment, the edge portion 64 of the seal 54 is tapered (e.g., as shown in FIG. 10) from the main portion 66 of the seal 54 down to the tip 68 of the edge portion 64. This taper aids in giving the edge portion 64 the flexibility to conform to the outer diameter of the electrochemical cell 24 but still maintain the strength to allow the edge portion 64 to keep its shape over time (e.g., to minimize creep and relaxation of the seal 54 to maintain the interference fit with the electrochemical cell 24).

According to an exemplary embodiment, a space 70 is provided between the edge portion 64 of the seal 54 and each socket 44 of the tray 42 (e.g., as shown in FIG. 10). The space 70 is connected (e.g., in fluid communication) with the chamber 50 such that when gases are vented into the chamber 50 the gases may enter the space 70 (e.g., by slipping past the bottom of the electrochemical cell 24 and the socket 44). According to an exemplary embodiment, the vented gases press the seal 54 tighter against the electrochemical cell 24 to increase the sealing characteristics of the seal 54.

Figure 11:
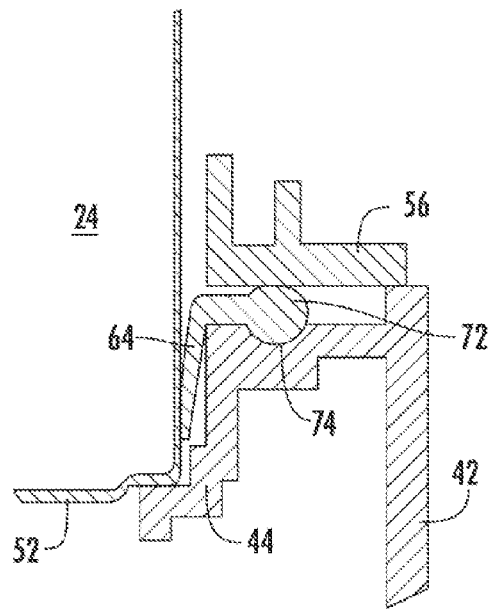
FIG. 11 is a detail view of a portion of the battery module of FIG. 9.

Referring now to FIG. 11, the seal 54 is shown to include an enlarged portion 72 provided in a trough or groove 74 of the upper surface of the tray 42. As shown in FIG. 11, when the enlarged portion 72 of the seal 54 is held in place by the clamping plate 56, the enlarged portion 72 of the seal 54 has several points of contact between the clamping plate 56 and/or the tray 42. According to an exemplary embodiment, a top of the enlarged portion 72 of the seal 54 has a single contact point with the clamping plate 56. According to another exemplary embodiment, the lower side of the enlarged portion 72 of the seal 54 has two contact points with the tray 42. According to another exemplary embodiment, the enlarged portion 72 of the seal 54 is compressed between the clamping plate 56 and the upper surface of the tray 42 so that the enlarged portion 72 of the seal 54 has a continuous line of contact with the clamping plate 56 and with the upper surface of the tray 42.

These multiple points and/or lines of contact aid in sealing (i.e., confining) vented gases in the chamber and do not allow the gases that have reached the space 70 in between the tray 42 and the edge portion 64 of the seal 54 to leak past. According to an exemplary embodiment, the enlarged portion 72 of the seal may be located along a perimeter of the seal 54. According to another exemplary embodiment, the enlarged portion 72 of the seal 54 substantially compliments the outer shape or perimeter of the tray 42.

Figure 10A:
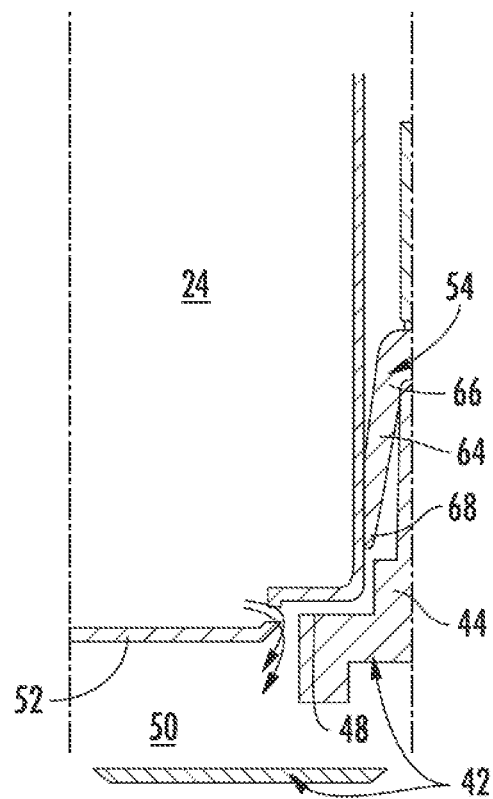
FIGS. 10A-10B are detail views of the battery module of FIG. 9 showing a vent in a deployed position according to an exemplary embodiment.
Figure 10B:
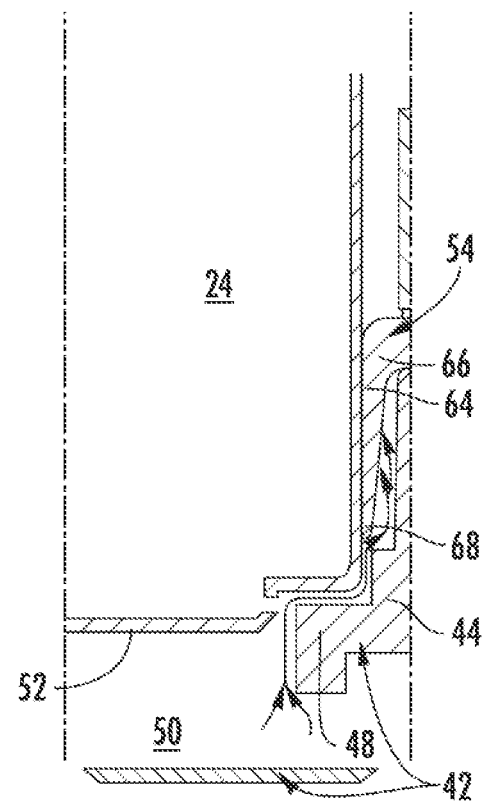

Referring now to FIGS. 10A and 10B, the electrochemical cell 24 is shown having the vent in a deployed state or position. When the vent 52 deploys, gases and/or effluent are allowed to escape the electrochemical cell 24 and enter the chamber 50, raising the pressure inside the chamber 50. In some instances, once the gases have entered the chamber 50, the gases may leak past the bottom of the electrochemical cell 24 and the tray 42 (e.g., as shown in FIG. 10B). These gases may then enter the space 70 provided between the seal 54 and the tray 42. When the vented gases enter this space 70, the seal 54 is moved (compressed, deformed, etc.) upward and pressed against the electrochemical cell 24 in order to create a tighter seal. This is due to the fact that the pressure inside the space 70 behind the seal 54 (and in the chamber 50) is greater than the pressure above the seal 54.

Referring now to FIGS. 12-18, various configurations of gaskets or seals are shown according to various exemplary embodiments. The seals 54 are intended to be used in the battery module 22 as shown in FIGS. 7-11. According to an exemplary embodiment, the seals 54 are all single unitary member seals (i.e., a single sheet) and include a plurality of openings 62. The openings 62 are configured to align with the sockets 44 of the tray 42 in order to receive the electrochemical cells 24 that are provided into the tray 42 in order to seal the chamber 50.

Figure 12:
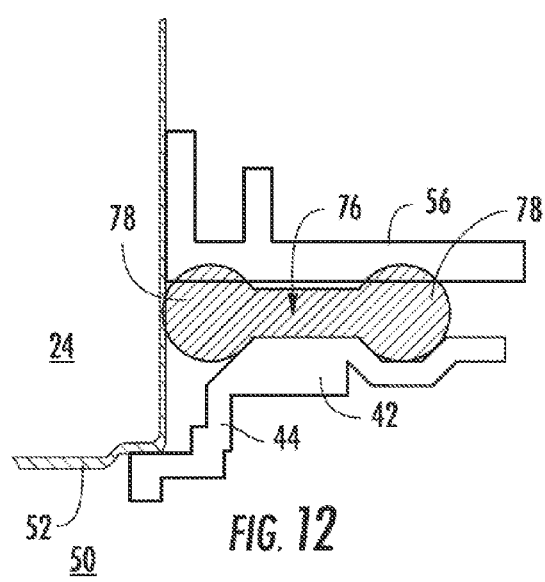
FIGS. 12-18 are cross-section views of a portion of various configurations of a seal for a battery module according to various exemplary embodiments.

Referring now to FIG. 12, a portion of a seal 76 is shown according to an exemplary embodiment. As shown in FIG. 12, the seal 76 includes at least two enlarged portions 78 configured to aid in sealing the space 70 between the electrochemical cell 24 and the tray 42 in order to keep vented gases inside the chamber 50. Both of the enlarged portions 78 provide multiple points of contact (e.g., between the seal 76 and the clamping plate 56, between the seal 76 and the electrochemical cell 24, and between the seal 76 and the tray 42). Having at least two enlarged portions 78 provides for an additional level of seal integrity (e.g., a redundant level of sealing). According to an exemplary embodiment, the enlarged portions 78 are spherical. According to other exemplary embodiments, the enlarged portions 78 may have different shapes (e.g., oval, cube, rectangular, etc.).

Figure 13:
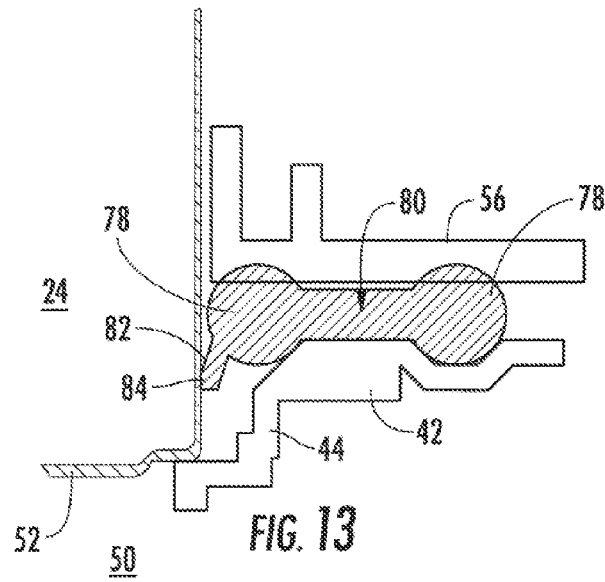

Referring now to FIG. 13, a portion of a seal 80 is shown according to an exemplary embodiment. The seal 80 is similar to the seal 76 shown in FIG. 12 with the addition of an edge portion 82. This edge portion 82 is configured to have an interference fit with an electrochemical cell 24 that is provided in the tray 42. As shown in FIG. 13, the edge portion 82 may be positioned in a generally downward angle. According to another exemplary embodiment, the edge portion 82 may have a tapered shape, similar to the edge portion 64 shown in FIGS. 10-11. According to another exemplary embodiment, the edge portion 82 may have a pointed tip 84.

Figure 14A:
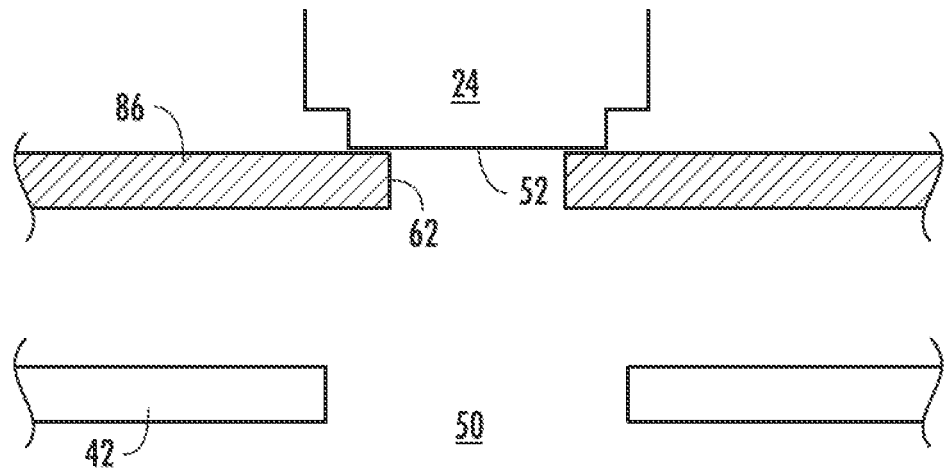
Figure 14B:
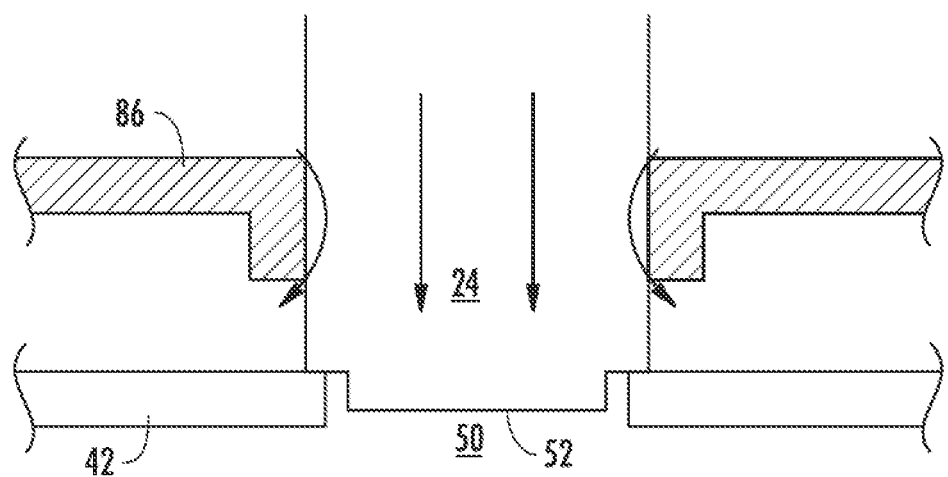

Referring now to FIGS. 14A-14B, a portion of a seal 86 is shown according to an exemplary embodiment. The openings 62 of the seal 86 are smaller than the external diameter of the electrochemical cells 24 in order to seal the electrochemical cells 24 and the vent chamber 50. The openings 62 of the seal 86 stretch to fit around the electrochemical cells 24 when the electrochemical cells 24 are provided into the tray 42. According to an exemplary embodiment, the seal 86 may be constructed from a flat molding process. According to another exemplary embodiment, the seal 86 may be die cut from a sheet of seal material (e.g., silicone or other suitable material). The flat molding or die cutting processes provides a seal 86 at a relatively inexpensive cost.

Figure 15A:
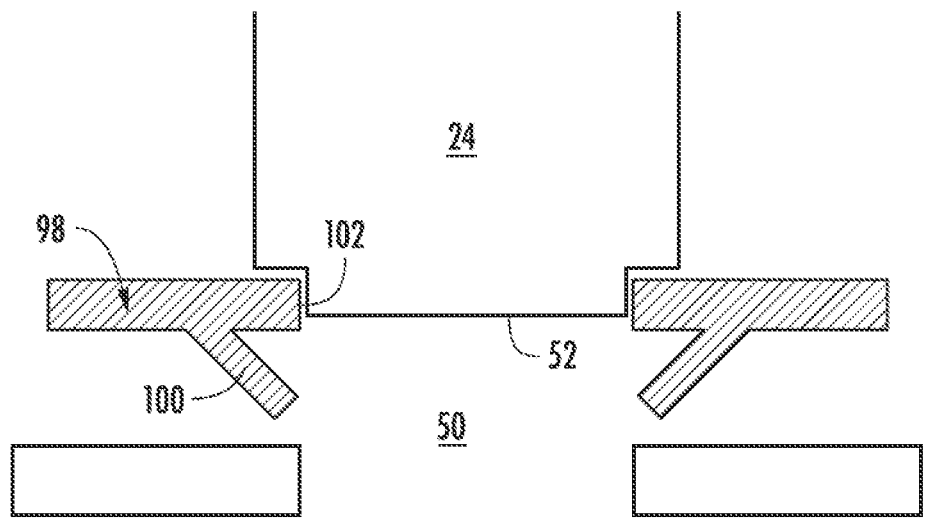
Figure 15B:
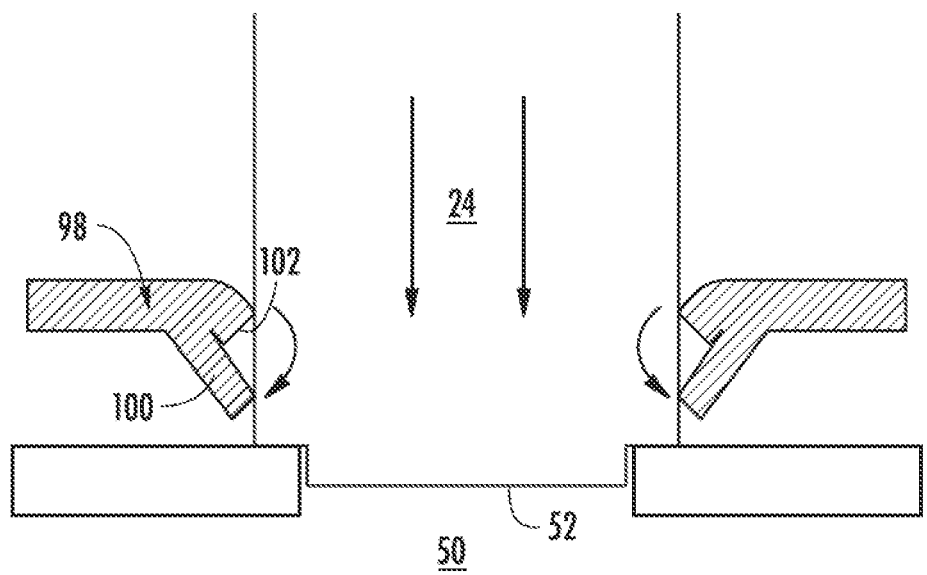

Referring now to FIGS. 15A-15B, a portion of a seal 98 is shown according to an exemplary embodiment. The seal 98 may be a molded seal constructed from any suitable material (e.g., silicone). According to an exemplary embodiment, the seal 98 has a member or arm 100 that is molded into the seal 98 adjacent each of the openings 102 of the seal 98. The opening 102 of the seal 98 and the arm 100 of the seal 98 are configured to have an interference fit with a cell 24 that is provided into the opening 102 of the seal 98. As such, the seal 98 provides for a double layer of sealing of the vent chamber 50. According to an exemplary embodiment, the molded arm 100 is underneath the opening of the seal 98 (e.g., as shown in FIGS. 15A-15B). According to another exemplary embodiment, the molded arm 100 is above the opening 102 of the seal 98.

Figure 16:
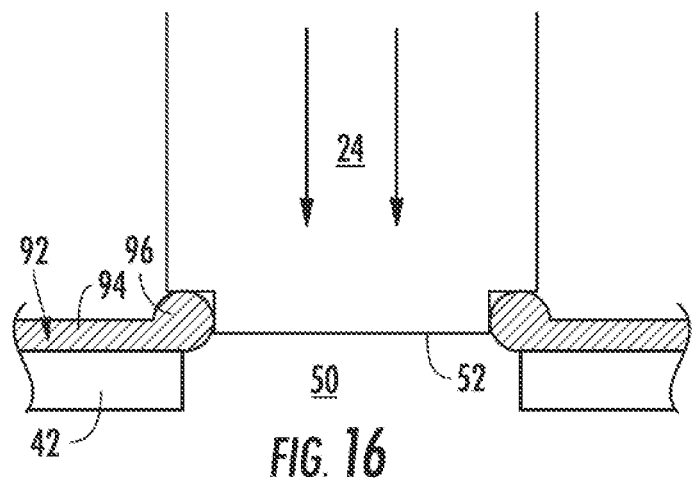

Referring now to FIG. 16, a portion of a seal 92 is shown according to an exemplary embodiment. The seal 92 is shown as a flat gasket 94 (e.g., formed by a flat molding process) and includes an enlarged portion or bulb 96 around the opening in the seal 92. According to an exemplary embodiment, the enlarged portion or bulb 96 of the seal 92 is configured to engage the electrochemical cell 24 in order to seal the electrochemical cell 24 and the vent chamber 50. According to another exemplary embodiment, the seal 92 is configured to engage a step of the electrochemical cell 24. According to an exemplary embodiment, clamping pressure (e.g., from a cover (not shown)) from when the cell is provided into the tray 42 aids in the sealing of the vent chamber 50.

Figure 17:
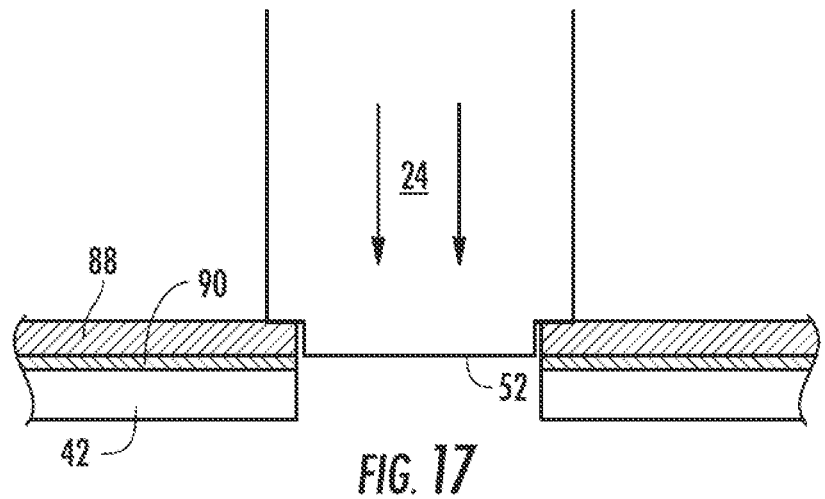

Referring now to FIG. 17, a portion of a seal 88 is shown according to an exemplary embodiment. The seal 88 is shown as a flat seal (e.g., made from the flat molding or die cutting processes described above) and includes a pressure sensitive adhesive layer 90. The seal 88 may be constructed from any suitable material (e.g., a closed cell foam). The seal 88 is provided on the top of the tray 42 with the pressure sensitive adhesive layer 90 in between the seal 88 and the top of the tray 42. When the cells 24 are provided in the tray 42, downward pressure from the cell 24 acts to clamp the seal 88 to the tray 42, sealing the vent chamber 50. According to an exemplary embodiment, the downward pressure may come from a cover (not shown) that is coupled to the tray 42.

Figure 18:
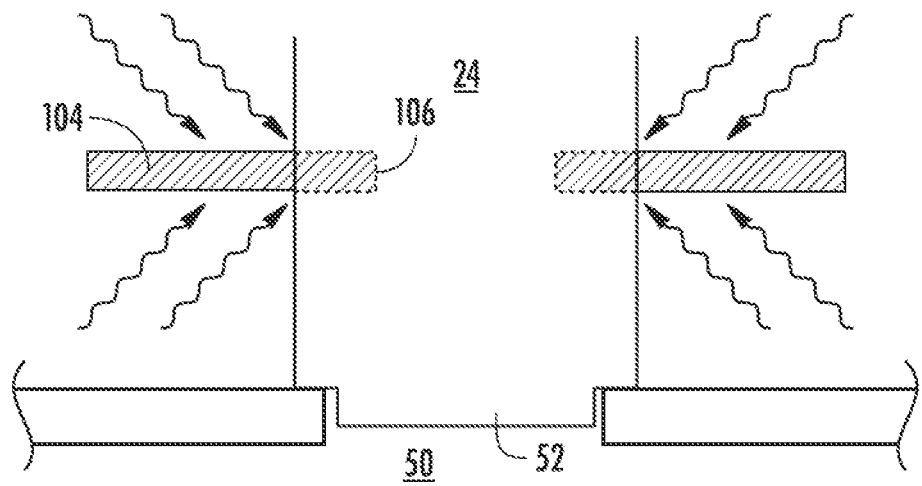

Referring now to FIG. 18, a portion of a seal 104 is shown according to an exemplary embodiment. According to an exemplary embodiment, the seal 104 is constructed from a heat sensitive material (e.g., a heat shrink material). According to an exemplary embodiment, openings 106 of the seal 104 are configured to shrink around the electrochemical cells 24 when the seal 104 is heated (e.g., with a heat gun, when the seal is placed in an oven, etc.). According to an exemplary embodiment, the openings 106 of the seal 104 may be provided with an initial interference fit with the electrochemical cells 24. According to another exemplary embodiment, the openings 106 of the seal 104 may be provided with an initial clearance fit with the electrochemical cells 24. In either case, upon heating of the seal 104, the seal 104 shrinks and/or adheres to the electrochemical cell 24 to provide a seal between the electrochemical cell 24 and the vent chamber 50.

Referring now to FIGS. 19-26, various configurations of gaskets or seals are shown according to various exemplary embodiments. The seals in FIGS. 19-26 are individual seals configured to be placed either on the individual electrochemical cell 24 itself or in the individual sockets 44 of the tray 42. These seals are configured to save material costs in that seal material does not need to be placed where sealing is not needed (such as in between the individual electrochemical cells 24 of the battery module 22). In other words, the seal is provided only where the seal is needed (i.e., around the lower end of the cell or in the socket 44 of the tray 42).

Figure 19:
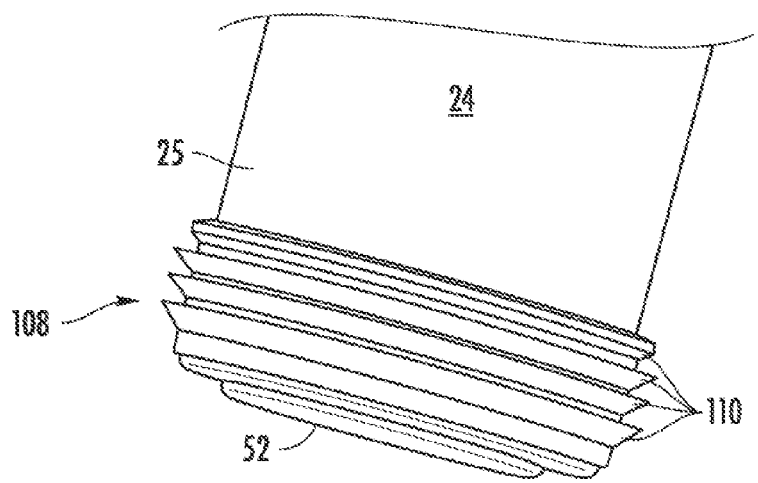
FIGS. 19-24 are views of a seal provided on an end of an electrochemical cell according to various exemplary embodiments.
Figure 20:
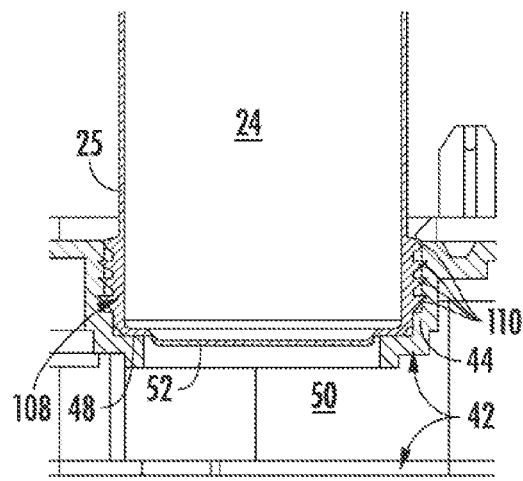
Figure 21:
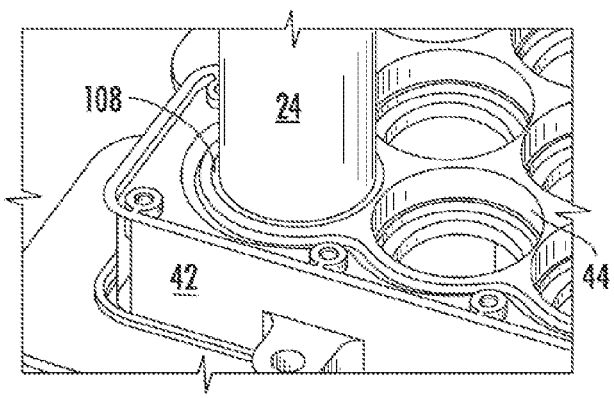

Referring now to FIGS. 19-21, a seal 108 is shown according to an exemplary embodiment. The seal 108 is provided on a lower end or portion of the electrochemical cell 24 and is provided to seal the electrochemical cell 24 and the chamber 50 to ensure that any gases vented into the chamber 50 do not leak out of the chamber 50. According to an exemplary embodiment, the seal 108 may be constructed from any suitable material (e.g., silicone). According to an exemplary embodiment, the seal 108 may be molded or overmolded onto the bottom of the housing 25 of the electrochemical cell 24. According to another exemplary embodiment, the seal 108 may be slid onto the housing 25 (e.g., like a rubberband).

According to an exemplary embodiment, the seal 108 includes a plurality of ridges 16 (projections, protrusions, ribs, etc.) configured to aid in sealing the electrochemical cell 24 and the chamber 50. According to an exemplary embodiment, the ridges 110 are tapered. According to an exemplary embodiment, the ridges 110 extend in a generally upward direction. According to other exemplary embodiments, the ridges 110 may extend straight out from the seal 108 or downward from the seal 108. According to an exemplary embodiment, there are four ridges 110 included on the seal 108. According to another exemplary embodiment, there may be a different number of ridges 110 included on the seal 108.

According to one exemplary embodiment, the generally upward direction of the ridges 110 aides in retaining the electrochemical cell 24 in the socket 44 of the tray 42. For example, once the electrochemical cell 24 having the seal 108 on it is provided into the socket 44, the ridges 110 help keep the electrochemical cell 24 in the socket 44 by a suction or biasing force that the ridges 110 exert on the socket 44. According to another exemplary embodiment, the ridges 110 of the seal 108 are configured to have an interference fit with the socket 44 of the tray 42.

According to an exemplary embodiment, the seal 108 is provided only on the external diameter of the cell housing 25. In other words, the seal 108 does not extend around the bottom of the electrochemical cell 24. According to another exemplary embodiment, the seal 108 may extend around the bottom of the electrochemical cell 24.

Figure 22:
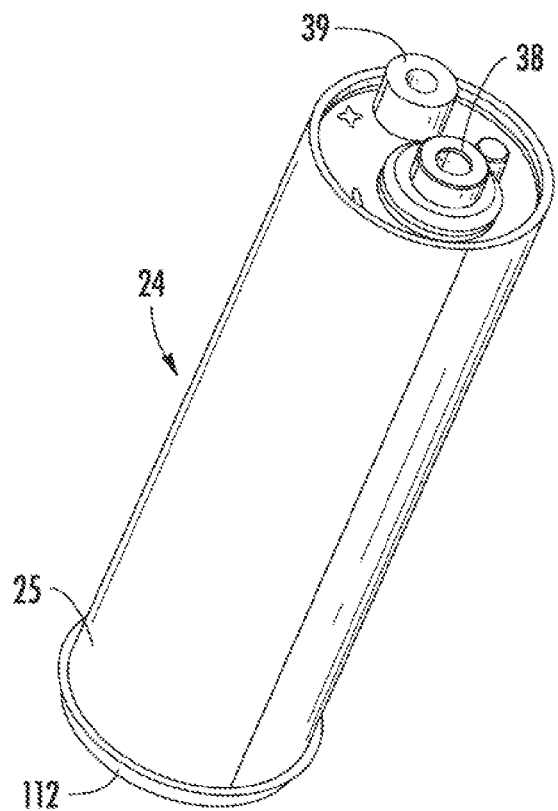
Figure 23:
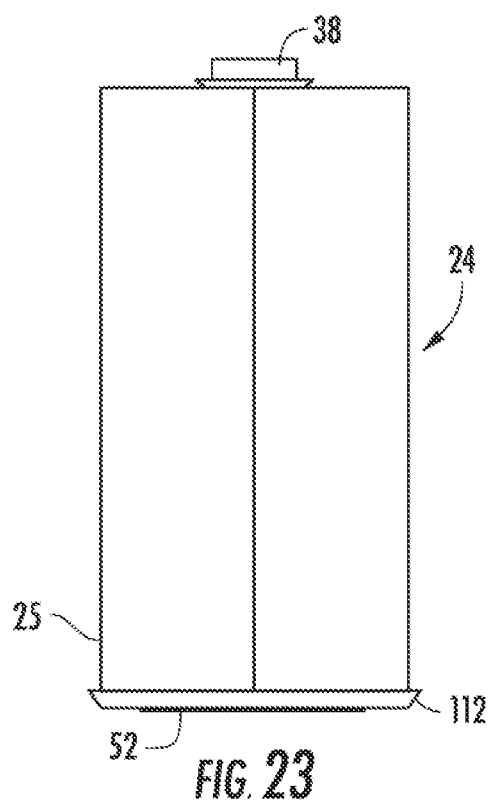
Figure 24:
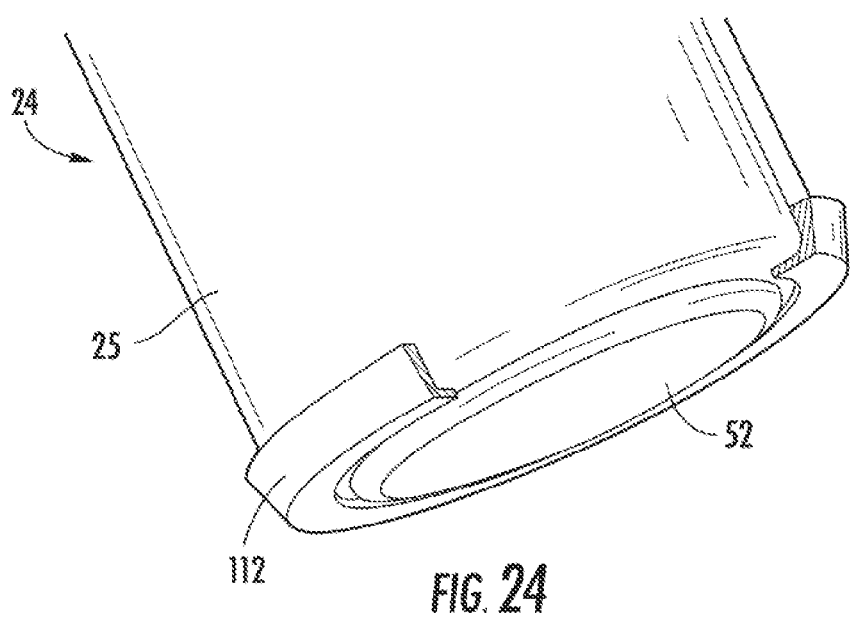

Referring now to FIGS. 22-24, a seal 112 is shown according to an exemplary embodiment. The seal 112 may be provided on a lower end of the electrochemical cell 24 in order to aid in the sealing of the electrochemical cell 24 and the chamber 50 (not shown). According to another exemplary embodiment, the seal 112 is configured to have an interference fit with the socket 44 of the tray 42 (not shown). According to another exemplary embodiment, the cross-sectional shape of the seal 112 may be tapered (e.g., as shown in FIG. 24) in order to help retain the electrochemical cell 24 in the socket 44.

According to an exemplary embodiment, the seal 112 is provided only on the external diameter of the cell housing 25. In other words, the seal 112 does not extend around the bottom of the electrochemical cell 24. According to another exemplary embodiment (e.g., as shown in FIG. 24), the seal 112 may extend around the bottom of the electrochemical cell 24. According to an exemplary embodiment, the seal 112 may be constructed from any suitable material (e.g., silicone). According to an exemplary embodiment, the seal 112 may be molded or overmolded onto the bottom of the housing 25 of the electrochemical cell 24. According to another exemplary embodiment, the seal 112 may be slid onto the housing 25 (e.g., like a rubberband).

Figure 25:
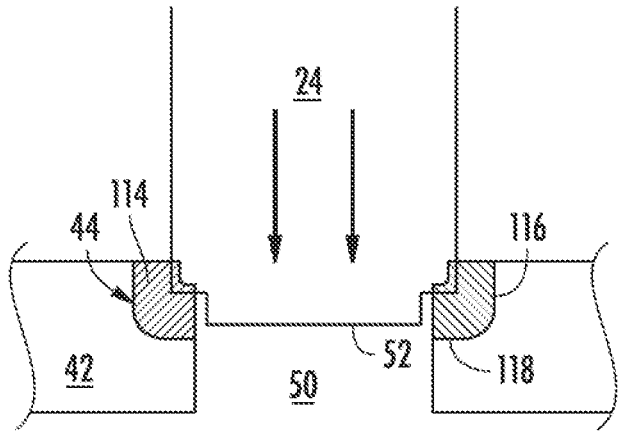
FIG. 25 is a cross-section view of a portion of a battery module having a seal according to another exemplary embodiment.

Referring now to FIG. 25, a seal 114 is shown according to an exemplary embodiment. As shown in FIG. 25, the seal 114 is a member that is overmolded around the internal diameter of the socket 44. According to an exemplary embodiment, the seal 114 may be constructed from any suitable material (e.g., silicone). According to an exemplary embodiment, when the electrochemical cell 24 is provided into the socket 44, a downward clamping force aids the sealing of the electrochemical cell 24 and the chamber 50. According to an exemplary embodiment, a housing or cover (not shown) may be provided in order to provide the downward clamping force necessary to help create the seal.

According to one exemplary embodiment, the seal 114 may extend over both the vertical surface 116 of the socket and the horizontal surface 118 of the socket 44 (e.g., as shown in FIG. 25). According to another exemplary embodiment, the seal 114 may only extend over the horizontal surface 118 of the socket 44 or only over the vertical surface 116 of the socket 44. According to another exemplary embodiment, the seal 114 may extend over the entire horizontal surface 118 of the socket 44. According to another exemplary embodiment, the seal 114 may only extend over a portion of the horizontal surface 118 of the socket 44. According to another exemplary embodiment, the seal 114 may extend over the entire vertical surface 116 of the socket 44. According to another exemplary embodiment, the seal 114 may only extend over a portion of the vertical surface 116 of the socket 44.

Figure 26:
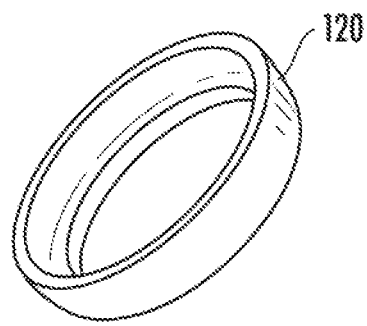
FIG. 26 is an isometric view of a seal for a battery module according to another exemplary embodiment.

Referring now to FIG. 26, a seal 120 is shown according to an exemplary embodiment. As shown in FIG. 26, the seal 120 is a separate member that is molded or formed independent of the tray 42. The seal 120 may have a shape similar to the seal 114 described in FIG. 25. However, the seal 120 may include a larger external diameter in order to have an interference fit with the socket 44 in order to retain the seal 120 in the socket 44. According to an exemplary embodiment, the seal 120 may be constructed from any suitable material (e.g., silicone). According to an exemplary embodiment, when an electrochemical cell 24 is provided into the socket 44, a downward clamping force aids the sealing of the cell and the chamber 50. According to an exemplary embodiment, a housing or cover (not shown) may be provided in order to provide the downward clamping force necessary to help create the seal.

Figure 27:
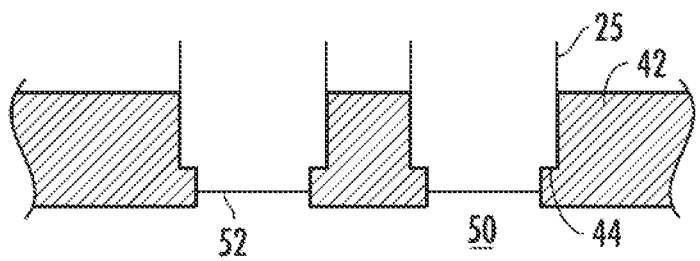
FIGS. 27-31 are views of various configurations of retaining an electrochemical cell in a tray of a battery module according to various exemplary embodiments.

Referring now to FIGS. 27-31, various configurations of retaining an electrochemical cell 24 in a tray 42 are shown according to various exemplary embodiments. As shown in FIG. 27, the cell housing 25 may be overmolded into a tray 42 according to an exemplary embodiment. A cell element (not shown) may then be provided into the housings 25 that are overmolded into the tray 42. Overmolding the housings 25 directly to the tray 42 eliminates the need for a separate seal(s). Eliminating the seal(s) may help to reduce the overall cost of the battery module 22 and the cost to assemble the battery module 22. Overmolding the housings 25 into the tray 42 also eliminates a potential leak path of the gases vented into the chamber 50.

Figure 28:
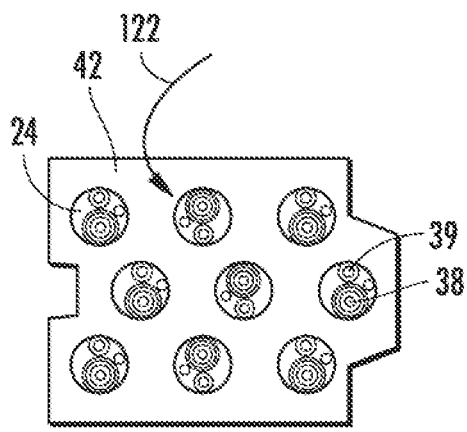

Referring now to FIG. 28, according to an exemplary embodiment, electrochemical cells 24 are provided in a tray 42 (e.g., the electrochemical cells 24 may be provided in sockets 44 in the tray 42 as shown in FIGS. 9-11). However, instead of having a seal provided as a separate member, a resin 122 is poured onto the tray and around the lower portion of the cells. Once the resin 122 is cured (e.g., by allowing the resin 122 to dry), the resin 122 retains the electrochemical cells 24 in the tray 42 and also seals the electrochemical cells 24 in the tray 42. For example, a liquid resin 122 (that is configured to harden) may be poured around the electrochemical cells 24.

According to an exemplary embodiment, the resin 122 is a non-conductive material. According to an exemplary embodiment, the resin 122 is provided in the tray 42 up to a height of approximately 3 to 4 millimeters. According to other exemplary embodiments, the resin 122 may be provided at a height of more or less than approximately 3 to 4 millimeters.

Figure 29:
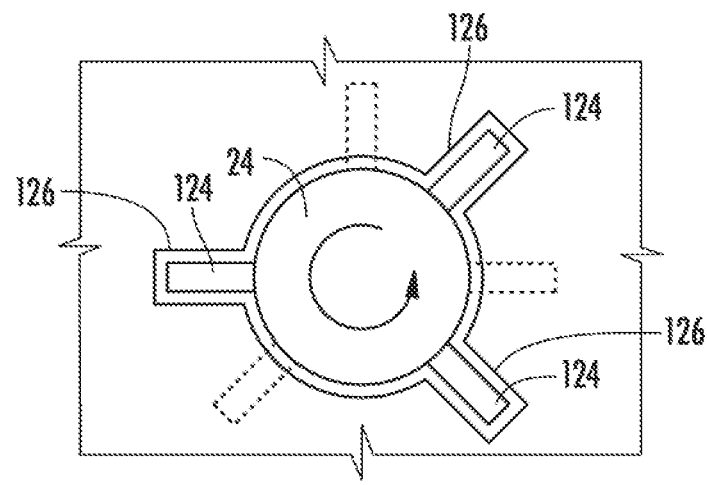
Figure 30:
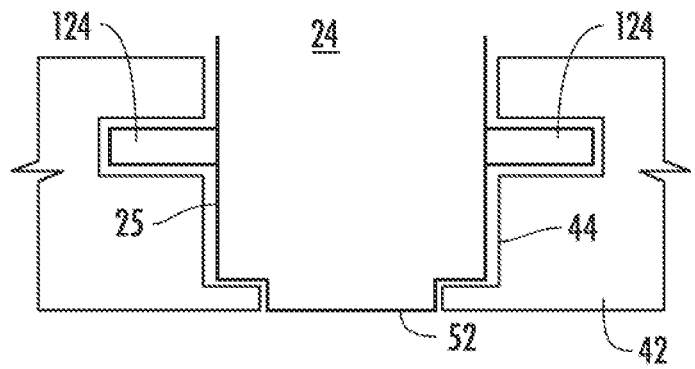

Referring now to FIGS. 29-30, a configuration of retaining an electrochemical cell 24 in a socket 44 is shown according to an exemplary embodiment. According to one exemplary embodiment, the electrochemical cell 24 may include a plurality of projections 124 (tabs, protrusions, locking devices, etc.) provided at a lower end of the electrochemical cell 24. The socket 44 of the tray 42 may be provided with corresponding or mating openings or apertures 126. The electrochemical cells 24 are locked or retained in the tray 42 by providing the electrochemical cell 24 (having the projections 124) into the socket 44 (having the mating openings 126) and then twisting or turning the electrochemical cell 24 to lock the cell into place.

According to another exemplary embodiment, the socket 44 may have the projections 124 and the electrochemical cell 24 may have the mating openings 126. According to another exemplary embodiment, an o-ring may be provided in between the electrochemical cell 24 and the socket 44 to aid in sealing the vent chamber 50.

Figure 31:
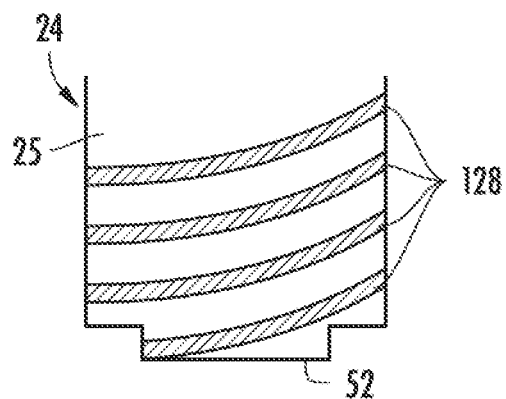
Figure 32:
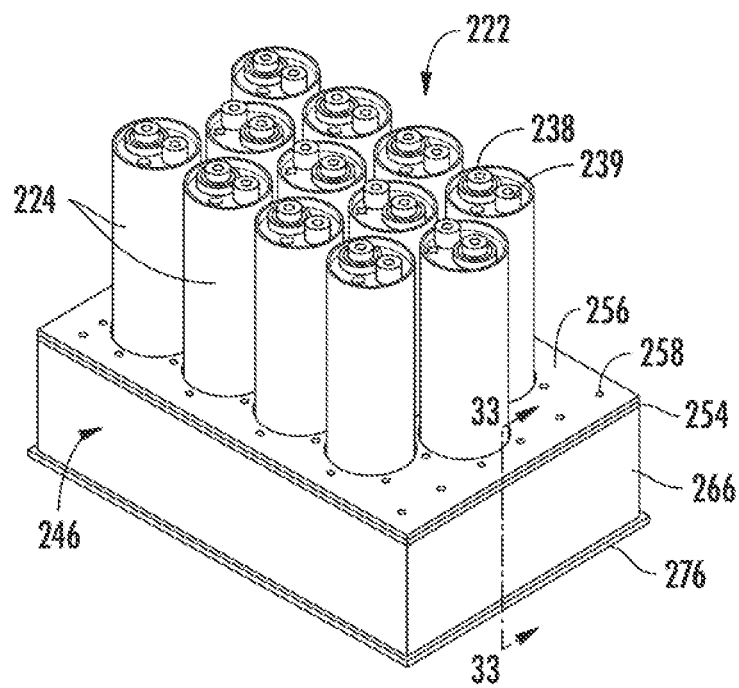
FIG. 32 is an isometric view of a portion of the battery module according to another exemplary embodiment.
Figure 33:
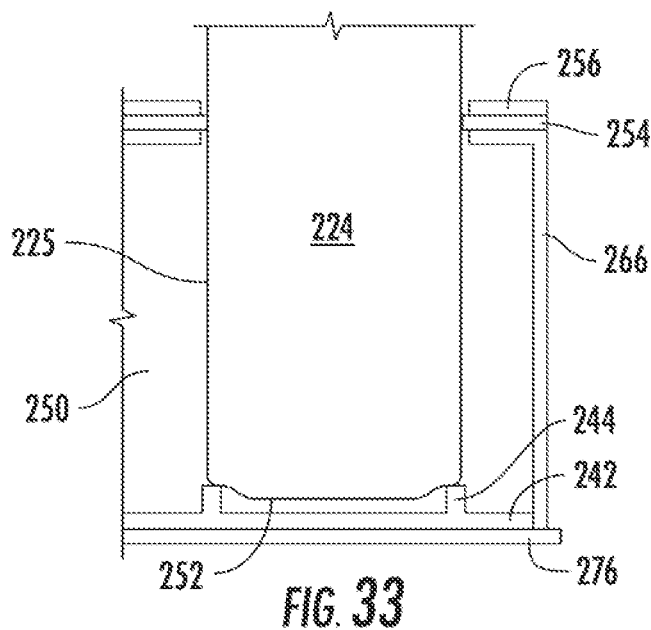
FIG. 33 is a cross-section view of a portion of the battery module of FIG. 32 taken along line 33-33 of FIG. 32.
Figure 34:
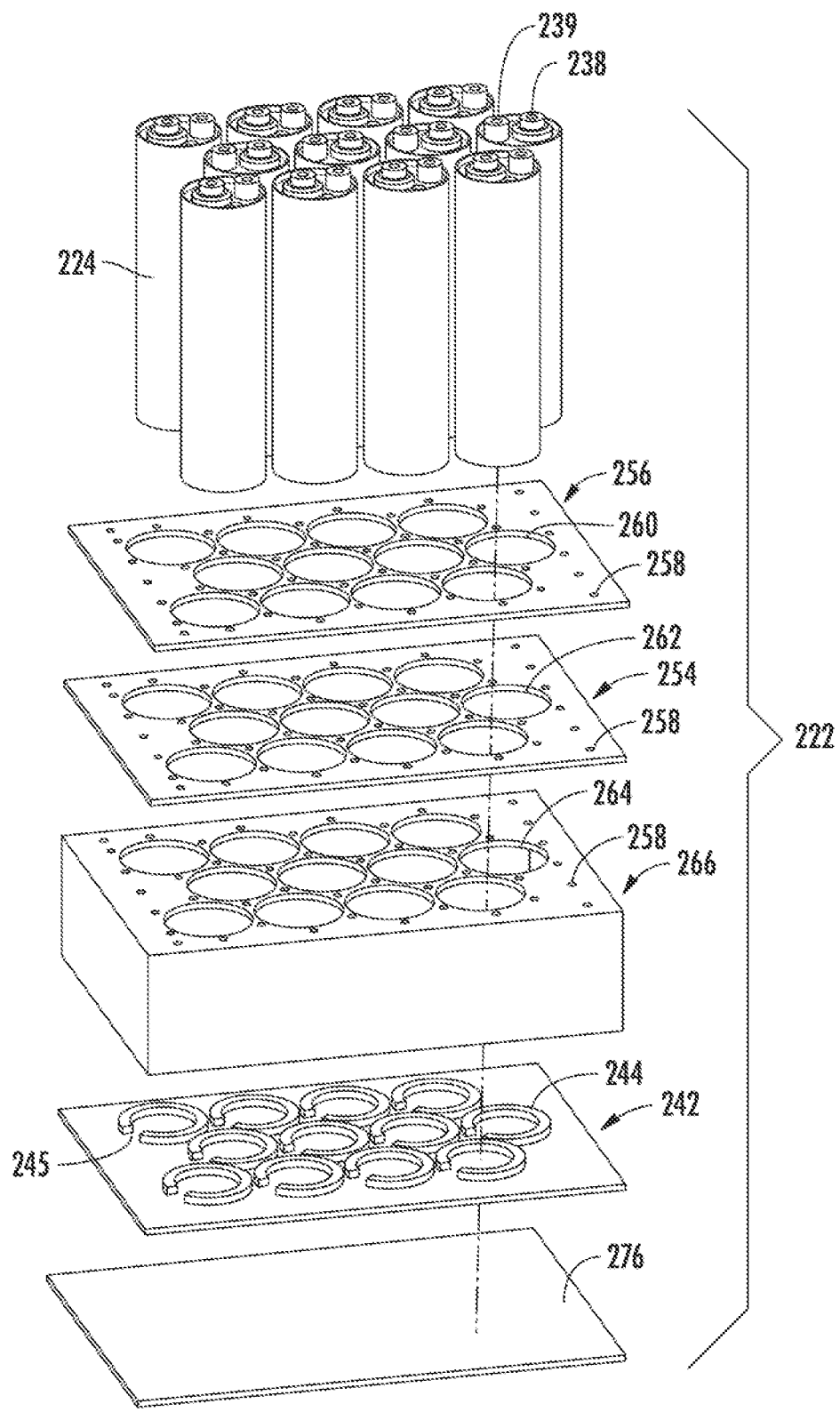
FIGS. 34-35 are partial exploded views of the battery module of FIG. 32.

Referring now to FIG. 31, another configuration of retaining an electrochemical cell 24 in a socket 44 of a tray 42 is shown according to an exemplary embodiment. As shown in FIG. 30, the electrochemical cell 24 may include a thread feature 128 on the housing 25 that is configured to engage a mating thread feature (not shown) in the socket 44 of the tray 42. The electrochemical cell 24 may then be threaded into the socket 44 in order to retain the electrochemical cell 24 in the tray 42. According to another exemplary embodiment, an o-ring (not shown) may be placed in between the electrochemical cell 24 and the socket 44 in order to aid in sealing the chamber 50.

Referring now to FIGS. 32-35, a portion of a battery pack or battery module 222 is shown according to another exemplary embodiment. The battery module 222 includes a plurality of electrochemical cells 224. Each of the electrochemical cells 224 comprises a casing or housing 225 (e.g., a can), terminals 238, 239, and a vent 252 (see, e.g., FIG. 33). The housing 225 is a generally hollow body that serves as a container for internal components (e.g., anode, cathode, electrolyte, etc.) of the electrochemical cell 224 and defines the external shape of the electrochemical cell 224.

According to an exemplary embodiment, the negative terminal 238 is a metallic member that is conductively coupled to the anode or negative electrode (not shown) provided within the electrochemical cell 224. The positive terminal 239 is a metallic member that is conductively coupled to the cathode or positive electrode (not shown) provided within the electrochemical cell 224. Each of the electrochemical cells 224 are electrically coupled to one or more other cells or other components of the battery module 222 using connectors provided in the form of bus bars or similar elements (not shown).

According to an exemplary embodiment, both the negative terminal 238 and positive terminal 239 are on one end of the housing 225 while the vent 252 is on the opposite end of the housing 225 opposite from the terminals 238, 239. According to another exemplary embodiment, the electrochemical cell 224 has one negative terminal 238 and one positive terminal 239. According to other exemplary embodiments, the electrochemical cell 224 may include a different number of terminals (e.g., two negative terminals and/or two positive terminals) or the terminals may be on opposite ends of the electrochemical cell 224.

As shown in FIGS. 32-35, a device or structure in the form of a base 246 is shown according to an exemplary embodiment. The base 246 is intended to retain, seal, and/or isolate vented gases and/or effluent from the electrochemical cells 224 into a housing or container having an internal plenum or chamber 250. According to an exemplary embodiment, the vented gases and/or effluent remain in the chamber 250 and are isolated from the remainder of the battery module 222 and the external environment. According to another exemplary embodiment, the vented gases and/or effluent may exit the chamber 250 through one or more openings (not shown) in the battery module 222 (e.g., though ductwork such as a tube or pipe that is in fluid communication with the chamber 250 of the retention system).

The base 246 includes a sealing element (e.g., a gasket or seal) and several members (e.g., frame members, retainers, trays, housings, containers, etc.) that locate and partially restrain the electrochemical cells 224 in a plurality of apertures or openings. According to an exemplary embodiment, the base 246 includes a first member 256 (e.g., a plate, cover, retainer, etc.), a second member 266 (e.g., a lower portion provided in the form of a box, container, housing, etc.), and a gasket or seal 254 provided between the first member 256 and the second member 266.

The second member 266 may be provided as a single integrally formed member having a bottom panel or plate 276 according to an exemplary embodiment. According to another exemplary embodiment, the bottom panel or plate 276 may be provided as a separate item that is coupled (e.g., welded) to the side walls or other structure of the second member 266. A tray 242 may be provided separate from the plate 276 (see, e.g., FIG. 34) that includes features 244 on which the electrochemical cells 224 may be provided. According to another exemplary embodiment, the features 244 may be integrally formed with the plate 276 to eliminate the need to have a separate tray 242. According to an exemplary embodiment, the features 244 include an opening or cut-out 245 configured to provide a path for the gases released from the electrochemical cells 224 (through vent 252) to reach the chamber 250.

Figure 35:
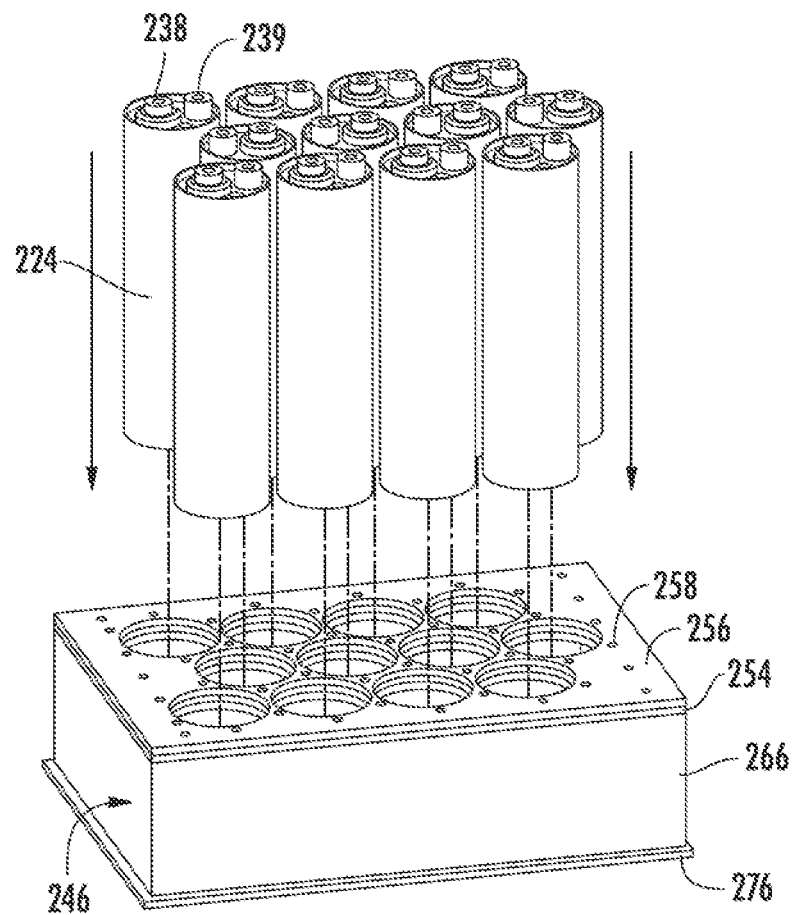
Figure 36:
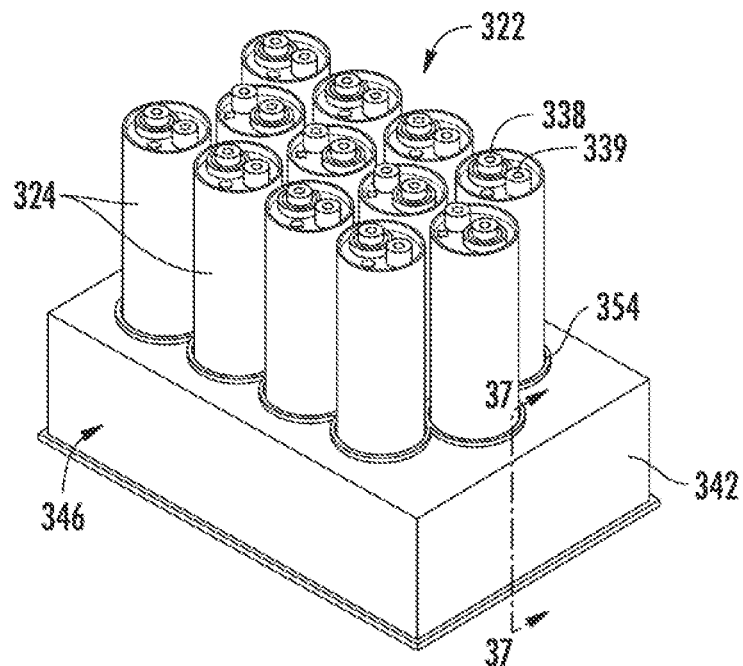
FIG. 36 is an isometric view of a portion of a battery module according to another exemplary embodiment.

The electrochemical cells 224 are arranged such that the lower portions of the electrochemical cells 224 are received in the base 246 (see, e.g., FIG. 35). According to an exemplary embodiment, the lower portions of the electrochemical cells 224 include a vent 252 for allowing gases and/or effluent to escape from the interior of the electrochemical cells 224. The electrochemical cells 224 are spaced apart from one another by the spacing of the apertures in the first member 256, second member 266, and seal 254. This spacing of the electrochemical cells 224 allows for a heating/cooling fluid or gas to be circulated around the top portions of the electrochemical cells 224.

According to an exemplary embodiment, the seal 254 is a resilient member with a plurality of apertures or openings 262 that are sized to receive the electrochemical cells 224 and form an interference fit with the housings 225 of the electrochemical cells 224. The interference fit formed between the seal 254 and the electrochemical cells 224 helps to create a gastight seal and prevent vented gases and/or effluent from the electrochemical cells 224 from escaping the chamber 250. The seal 254 is a generally flat member with a first or top surface and a bottom or second surface. According to one exemplary embodiment, the seal 254 is formed from a high heat silicone material. According to other exemplary embodiments, the seal 254 may be formed from any other suitable material that is able to form a gastight seal with the electrochemical cells 224.

The seal 254 is provided between the first member 256 and the second member 266. The first or top member 256 is provided on the first side of the seal 254 and the second or bottom member 266 is provided on the second side of the seal 254. The first member 256 and the second member 266 form apertures or openings 260, 264 that are aligned with the openings 262 in the seal 254. The second or bottom member 266 comprises top portion and a skirt or sidewall. According to one exemplary embodiment, the sidewall is integrally formed with the second member 266. According to other exemplary embodiments, the sidewall may be provided as a separate component and coupled to the top portion.

The third member or base plate 276 is coupled to the sidewall of the second member 266 (e.g., with fasteners, a weld, a snap-fit, adhesives, etc.). According to an exemplary embodiment, the third member 276 forms a gastight seal with the sidewall of the second member 266. According to another exemplary embodiment, the third member may be integrally formed with the second member 266.

A tray 242 is provided that comprises a plurality of features 244 that hold (e.g., retain, position, etc.) the bottoms of the electrochemical cells 224 above the third member 276. According to an exemplary embodiment, the tray 242 is a separate component from the third member 276. According to another exemplary embodiment, the tray 242 may be integrally formed with the third member 276, the second member 266, or another component.

According to an exemplary embodiment in which a separate third member 276 is provided, the battery module 222 is formed by first coupling the third member 276 to the sidewall of the second member 266 (e.g., with a vibration welding process). The second member 266 and the third member 276 define a box-like structure surrounding a chamber 250 to contain any gases or effluent expelled from the vents 252 of the electrochemical cells 224. The seal 254 is then provided on top of the second member 266. The first member 256 is then coupled to the second member 266 (e.g., with fasteners (not shown) such as screws or bolts received in threaded holes 258, adhesives, snap-fit connections, etc.), retaining the seal 254 between the first member 256 and the second member 266.

The electrochemical cells 224 are then inserted (see, e.g., FIG. 35) into openings 260 in the first member 256 so that the vents 252 of the electrochemical cells 224 are located within the chamber 250 formed by the second member 266 (including the sidewalls of the second member) and the third member 276. As shown best in FIG. 33, the openings 260, 264 in the first member 256 and the second member 266 are slightly larger than the openings 262 in the seal 254. These slightly larger openings 260, 264 create a clearance space between the housing 225 of the electrochemical cells 224 and the first member 256 and the second member 266 to allow the cells to be more easily placed into the first member 256 and the second member 266.

One advantageous feature of the battery module 222 as illustrated in FIGS. 32-35 is that in the event that one or more of the electrochemical cells 224 exhausts gases and/or effluent during operation, the gases and/or effluent may be contained within the base 246 without venting to the surrounding atmosphere. The seal 254 provides a relatively gastight fit between the housings 225 of the electrochemical cells 224 that are inserted into the base 246 so that the gases and/or effluent do not escape through the openings into which the electrochemical cells 224 are inserted.

According to an exemplary embodiment, a hose or conduit (not shown) may be provided in fluid communication with the chamber 250 of the battery module 222 to allow the gases and/or effluent to be routed to a desired location (e.g., outside of a vehicle in which the battery module 222 is provided). According to other exemplary embodiments, the gases and/or effluent may be contained within the base 246 without routing them to a desired location (e.g., the gases and/or effluent may be removed from the base 246 at a desired later time).

Referring now to FIGS. 36-39, a battery pack or battery module 322 is shown according to another exemplary embodiment. The battery module 322 includes a plurality of electrochemical cells 324. Each of the electrochemical cells 324 comprises a casing or housing 325 (e.g., a can), terminals 338, 339, and a vent 352 (see, e.g., FIG. 37). The housing 325 is a generally hollow body that serves as a container for internal components (e.g., anode, cathode, electrolyte, etc.) of the electrochemical cell 324 and defines the external shape of the electrochemical cell 324.

According to an exemplary embodiment, the negative terminal 338 is a metallic member that is conductively coupled to the anode or negative electrode (not shown) provided within the electrochemical cell 324. The positive terminal 339 is a metallic member that is conductively coupled to the cathode or positive electrode (not shown) provided within the electrochemical cell 324. Each of the electrochemical cells 324 are electrically coupled to one or more other cells or other components of the battery module 322 using connectors provided in the form of bus bars or similar elements (not shown).

According to an exemplary embodiment, both the negative terminal 338 and positive terminal 339 are on one end of the housing 325 while the vent 352 is on the opposite end of the housing 325 opposite from the terminals 338, 339. According to another exemplary embodiment, the electrochemical cell 324 has one negative terminal 338 and one positive terminal 339. According to other exemplary embodiments, the electrochemical cell 324 may include a different number of terminals (e.g., two negative terminals and/or two positive terminals) or the terminals may be on opposite ends of the electrochemical cell 324.

As shown in FIGS. 36-39, a device or structure in the form of a base 346 is shown according to an exemplary embodiment. The base 346 is intended to retain, seal, and/or isolate vented gases and/or effluent from the electrochemical cells 324 into a housing or container having an internal plenum or chamber 350. According to an exemplary embodiment, the vented gases and/or effluent remain in the chamber 350 and are isolated from the remainder of the battery module 322 and the external environment. According to another exemplary embodiment, the vented gases and/or effluent may exit the chamber 350 through one or more openings (not shown) in the battery module 322 (e.g., though ductwork such as a tube or pipe that is in fluid communication with the chamber 350 of the retention system).

The base 346 includes a structure (e.g., frame member, retainer, tray, housing, container, etc.) that locates and/or partially restrains the electrochemical cells 324 in a plurality of apertures or openings. According to an exemplary embodiment, the base 346 includes a first member or tray 342 having a socket 344 configured to receive the electrochemical cell 324. According to an exemplary embodiment, the socket 344 has a first step 346 configured to receive (e.g., hold, retain, etc.) a sealing element or gasket shown as seal 354. The socket 344 also comprises a second step 347 upon which a bottom portion of the electrochemical cell 324 rests, placing the vent 352 of the electrochemical cell 324 in the chamber 350.

The tray 342 may be provided as a single integrally formed member having a bottom panel or plate 376 according to an exemplary embodiment. According to another exemplary embodiment, the bottom panel or plate 376 may be provided as a separate item that is coupled (e.g., welded) to the side walls or other structure of the tray 342. According to an exemplary embodiment, the socket 344 may be integrally formed with the tray 342. According to another exemplary embodiment, the socket 344 may be provided separately from the tray 342 and coupled (e.g., welded) to a top portion of the tray 342.

Figure 39:
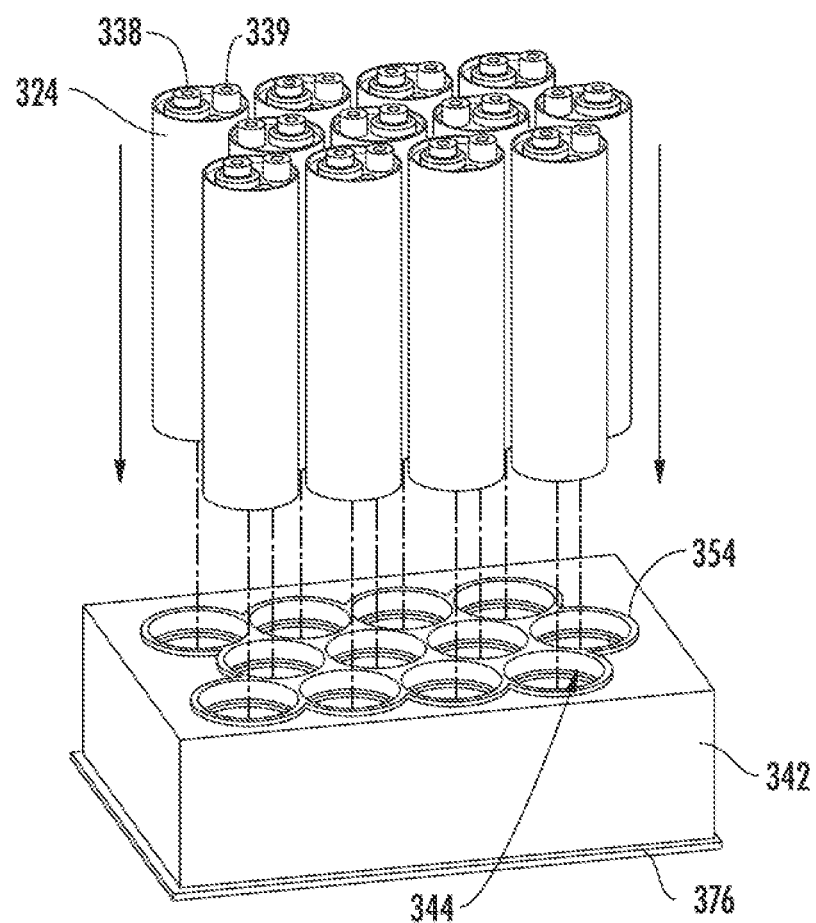

The electrochemical cells 324 are arranged such that the lower portions of the electrochemical cells 324 are received in the base 346 (see, e.g., FIG. 39). According to an exemplary embodiment, the lower portions of the electrochemical cells 324 include a vent 352 for allowing gases and/or effluent to escape from the interior of the electrochemical cells 324. The electrochemical cells 324 are spaced apart from one another by the spacing of the sockets 344. This spacing of the electrochemical cells 324 allows for a heating/cooling fluid or gas to be circulated around the top portions of the electrochemical cells 324.

According to an exemplary embodiment, the seal 354 is a resilient member with a plurality of apertures or openings 362 that are sized to receive the electrochemical cells 324 and form an interference fit with the housings 325 of the electrochemical cells 324. The interference fit formed between the seal 354 and the electrochemical cells 324 helps to create a gastight seal and prevent vented gases and/or effluent from the electrochemical cells 324 from escaping the chamber 350. The seal 354 is a generally flat member of trays tangentially joined rings (see, e.g., FIG. 38). According to one exemplary embodiment, the seal 354 is formed from a high heat silicone material. According to other exemplary embodiments, the seal 354 may be formed from any other suitable material that is able to form a gastight seal with the electrochemical cells 324.

Figure 37:
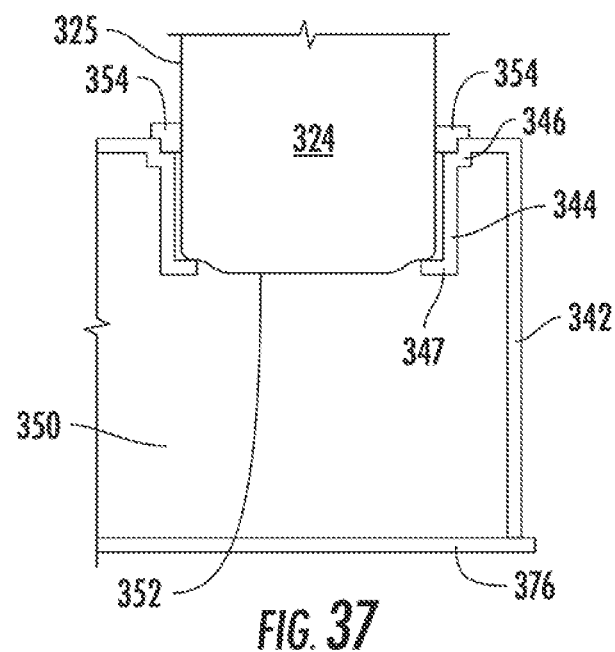
FIG. 37 is a cross-section view of a portion of the battery module of FIG. 36 taken along line 37-37 of FIG. 36.

According to an exemplary embodiment, as shown, for example, in FIG. 37, the seal 354 is received by the first step 346 of the socket 344. According to an exemplary embodiment, the seal 354 extends above a top surface of the tray 342, but according to other exemplary embodiments, the seal 354 may not extend above the tray 342. According to another exemplary embodiment, the seal 354 may not extend to the second step 347 of the socket 344, but according to other exemplary embodiments, the seal 354 may extend to the second step 347 of the socket 344. According to other exemplary embodiments, the socket 344 may be shorter than what is shown in FIG. 37.

Figure 38:
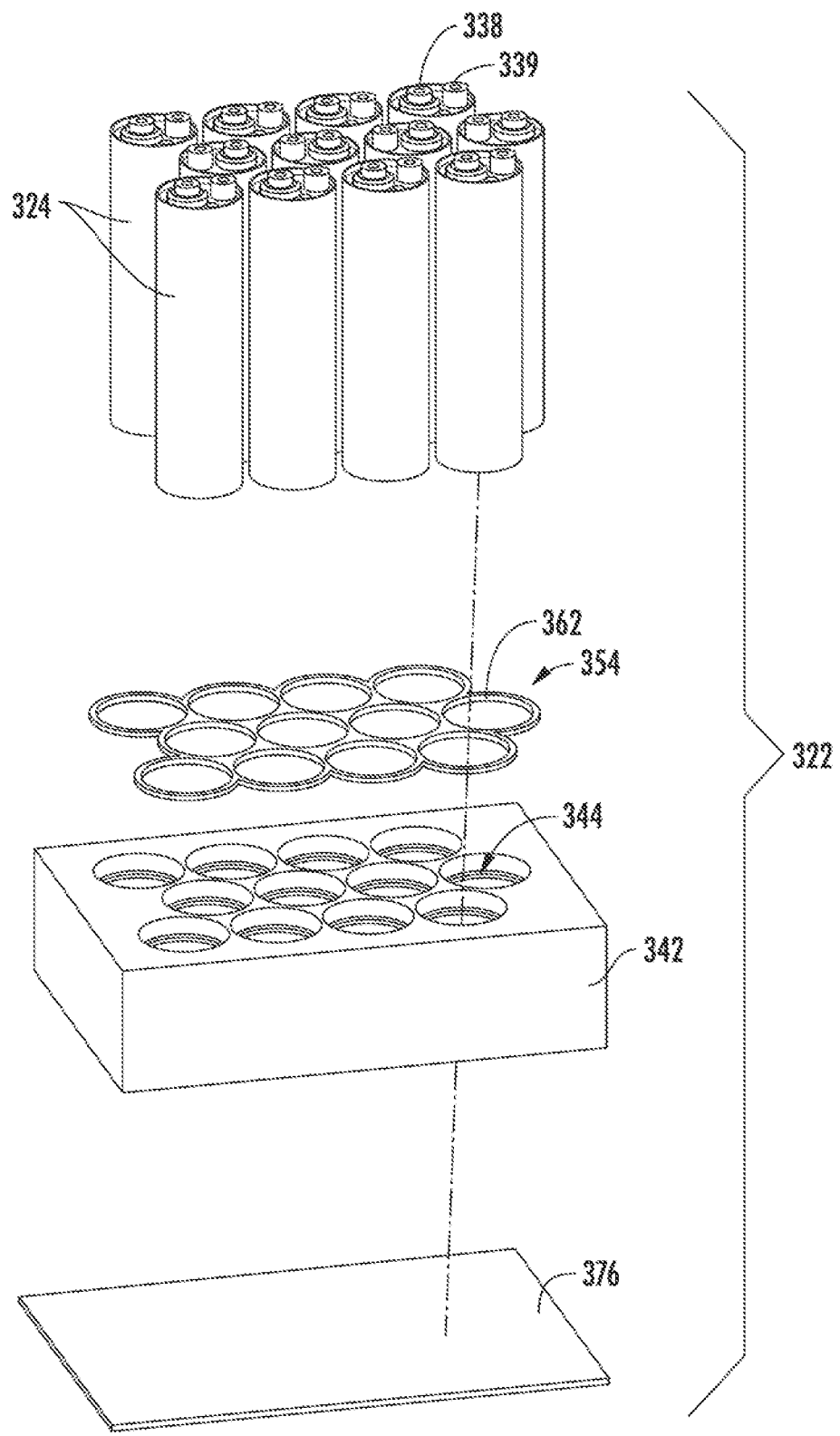
FIGS. 38-39 are partial exploded views of the battery module of FIG. 36.

As shown in FIG. 38, for example, the seal 354 is configured to use an efficient amount of sealing material. As such, the seal 354 consists of ring-like members that are joined at their edges (e.g., tangentially), with an outer contour of the seal 354 substantially matching the outer perimeter of the electrochemical cells 324. Advantageously, the sealing material is only provided where needed (i.e., between the electrochemical cells 324 and the socket 344 of the tray 342). Therefore, the seal 354 saves costs related to a reduced amount of material needed to provide seal 354.

According to another exemplary embodiment, the seal 354 is configured for use with the battery module 322 without the use of any fasteners to retain the seal 354 in place. Because the seal 354 is configured for an interference fit with the electrochemical cells 324, the seal 354 is held in place once the electrochemical cells 324 are provided in the socket 344 of the tray 342. In essence, the housing 325 of the electrochemical cells 324 compress and or retain the seal 354 in proper position. Therefore, costs can be saved in that no fasteners (or holes to receive the fasteners) are required and the time that would be required to assemble the battery module 322 with fasteners is eliminated.

According to an exemplary embodiment, the battery module 322 is formed by first coupling the plate 376 to the tray 342 (e.g., with a vibration welding process) if the plate 376 is not already integrally formed with the tray 342. The tray 342 and the plate 376 define a box-like structure surrounding the chamber 350 to contain any gases or effluent expelled from the vents 352 of the electrochemical cells 324. The seal 354 is then provided in the sockets 344 of the tray 342.

According to an exemplary embodiment, the openings 362 of the seal 354 are aligned with the openings of the sockets 344. According to an exemplary embodiment, the seal 354 is provided as a single unitary body that may be made from an injection molded silicone. According to another exemplary embodiment, the seal 354 may be overmolded directly to the socket 344 (e.g., the first step 346 of the socket 344). In either case, no fasteners are needed in order to retain the seal 354 to the tray 342.

The electrochemical cells 324 are then inserted (see, e.g., FIG. 39) into openings 362 in the seal 354 and are received by the sockets 344 so that the vents 352 of the electrochemical cells 324 are located within the chamber 350. The internal diameters of the openings 362 of the seal 354 are configured to have a smaller diameter than the external diameter of the housing 325 of the electrochemical cells 324. Thus, an interference fit is created when the electrochemical cells 324 are provided through the openings 362 of the seal 354. According to an exemplary embodiment, the internal diameter of the socket 344 may be configured for a clearance with respect to the external diameter of the housing 325 of the electrochemical cell 324 in order to allow the electrochemical cells 324 to be more easily placed into the socket 344.

One advantageous feature of the battery module 322 as illustrated in FIGS. 36-39 is that in the event that one or more of the electrochemical cells 324 exhausts gases and/or effluent during operation, the gases and/or effluent may be contained within the base 346 without venting to the surrounding atmosphere. The seal 354 provides a relatively gastight fit between the housings 325 of the electrochemical cells 324 that are inserted into the base 346 so that the gases and/or effluent do not escape through the openings into which the electrochemical cells 324 are inserted.

According to an exemplary embodiment, a hose or conduit (not shown) may be provided in fluid communication with the chamber 350 of the battery module 322 to allow the gases and/or effluent to be routed to a desired location (e.g., outside of a vehicle in which the battery module 322 is provided). According to other exemplary embodiments, the gases and/or effluent may be contained within the base 346 without routing them to a desired location (e.g., the gases and/or effluent may be removed from the base 346 at a desired later time).

Referring now to FIGS. 40A-40D, a portion of the battery module is shown according to an exemplary embodiment. The battery module includes an electrochemical cell 424 having a generally cylindrical housing 425. According to an exemplary embodiment, the electrochemical cell 424 includes a vent 452 provided at a bottom portion of the housing 425. According to an exemplary embodiment, the vent 452 acts as a safety device for the electrochemical cell 424 during a high pressure occurrence.

According to an exemplary embodiment, the vent 452 is configured to allow gases and/or effluent to exit the electrochemical cell 424 when pressure inside the electrochemical cell 424 reaches a predetermined amount (e.g., during a rise in cell temperature). When the vent 452 deploys (e.g., activates, opens, separates, etc.), the gases and/or effluent inside the electrochemical cell 424 exit the electrochemical cell 424 in order to lower the pressure inside the electrochemical cell 424. According to an exemplary embodiment, the gases are received in a chamber 450. According to an exemplary embodiment, the gases are retained in the chamber 450 by a seal 454.

As shown in FIG. 40A, the vent 452 is located in the bottom portion of the housing 425. According to other exemplary embodiments, the vent 452 may be located elsewhere. According to another exemplary embodiment, the vent 452 may be located in a cover or bottom that is a separate component from the housing 425 that is coupled (e.g., welded) to the housing 425.

According to an exemplary embodiment, the vent 452 includes a weakened area or fracture point 453. According to an exemplary embodiment, the fracture point 453 is a circular ring along the bottom portion of the housing 425 where the vent 452 is coupled to the housing 425. When the vent 452 deploys (e.g., once the pressure inside the cell reaches a predetermined amount), the vent 452 is configured to separate from the bottom of the housing 425 at the fracture point 453.

In certain situations, however, as shown in FIG. 40B, the vent 452 may initially only partially separate from the cell housing 425. In order to correct such an occurrence, a vent opening feature 446 is provided adjacent the vent 452. The vent opening feature 446 is configured to aid in the full deployment of the vent 452 by maintaining an elevated gas pressure behind the vent 452 in order to help drive (e.g., force, push, etc.) the vent 452 to open completely.

As shown in FIGS. 40A-40D, according to an exemplary embodiment, the vent opening feature 446 is provided concentrically around the vent 452 of each of the electrochemical cells 424. The vent opening feature 446 comprises a first surface 447 that is substantially parallel to the direction of deployment of the vent 452. The vent opening feature 446 also comprises a second surface 448 that is configured to extend from the first surface 447. According to an exemplary embodiment, the second surface 448 extends away from the first surface 447 at an angle (e.g., a downward angle). The vent opening feature 446 further comprises a bottom surface 449 shown as a cut-out in FIGS. 40A-40D.

According to an exemplary embodiment, the first surface 447 of the vent opening feature 446 is provided in close proximity to an outer circumference (e.g., outer edge) of the vent 452. According to one exemplary embodiment, the first surface 447 is provided at a minimum distance required by the dimensional variation of the components and the battery module to allow the vent 452 to open.

According to an exemplary embodiment, the gap or opening created between the outer edge of the vent 452 and the first surface 447 creates a large pressure drop between the high pressure gases in the electrochemical cell 424 and the chamber 450. According to an exemplary embodiment, the high pressure drop helps to retain a high pressure inside the electrochemical cell 424 until the vent 452 fully deploys or separates from the cell 424 (e.g., as shown in FIG. 40C). The high pressure in the electrochemical cell 424 helps to fully deploy (e.g., push, separate, force, etc.) the vent 452.

Once the vent 452 is fully deployed, the vent 452 continues to travel downward into the chamber 450 (e.g., as shown in FIG. 40D). During the transition of the vent 452 to full deployment, the outer edge of the vent 452 passes by the second surface 448 of the vent opening feature 446. Due to the angle of the second surface 448, the gases from the electrochemical cell 424 may be released more quickly, thus dissipating or lowering the gas pressure inside electrochemical cell 424 more quickly once the vent 452 has completely separated from the housing 425.

According to an exemplary embodiment, the vent 452 is part of the current path of the electrochemical cell 424. For example, a cell element (not shown) provided in the electrochemical cell 424 may be electrically connected to the vent 452 (e.g., by a current collector (not shown)). The vent 452, in turn, is electrically connected to the housing 425, which may be electrically connected to a terminal (not shown). By having the vent 452 separate from the housing 425, the vent 452 may be configured to act as a current interrupt or current disconnect device. This is because the separation of the vent 452 from the housing 425 disrupts the flow of current from the cell element to the terminal. By having vent 452 fully separate from the housing 425, the vent 452 acts as a current disconnect device.

Figure 41A:
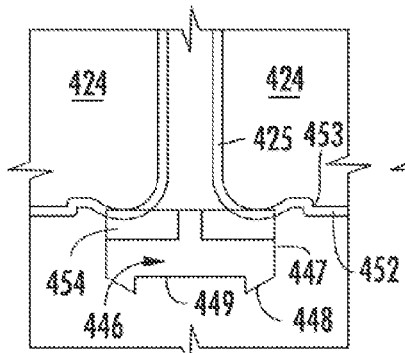
FIGS. 41A-41G are detail views of a vent opening feature as shown in FIG. 40A according to various exemplary embodiments.

Referring now to FIGS. 41A-41G, various configurations of a vent opening feature are shown according to various exemplary embodiments. FIG. 41A shows the vent opening feature 446 as shown in FIG. 40A. According to an exemplary embodiment, the first surface 447 has a vertical height such that a high pressure drop is created between the electrochemical cell 424 and the chamber 450 when only a portion of the vent 452 deploys from the electrochemical cell 424 (e.g., as shown in FIG. 40B).

According to another exemplary embodiment, the second surface 448 extends angularly downward from the first surface 447 to create a transitional area in order to increase the flow of gases releases from the electrochemical cell 424. The bottom or cut-out 449 of the vent opening feature 446 may be provided to reduce the amount of material used in the vent opening feature 446. Cut-out 449 may be provided to provide additional space in the chamber 450, thus decreasing the overall pressure in the chamber 450 once the vent 452 has reached the second surface 448.

According to other exemplary embodiments, the configuration of the vent opening feature 446 may be modified. For example, the length of the first surface 447, the angle of the second surface 448 and/or the bottom or cut-out 449 may be modified (e.g., lengthened, shortened, steepened, flattened, etc.) in order to meet the design requirements of the battery module.

Figure 41B:
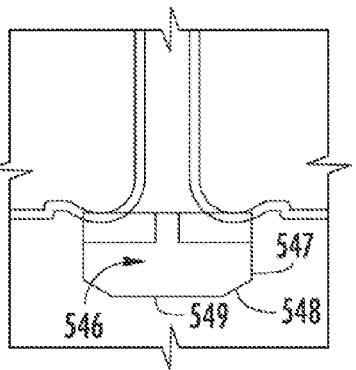
Figure 41C:
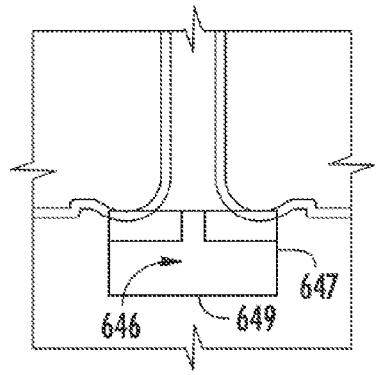

For example, according to an exemplary embodiment as shown in FIG. 41B, the cut-out 449 is replaced by a smooth transition bottom 549. As shown in FIG. 41C, for example, according to an exemplary embodiment, the first surface 647 extends all the way to the bottom 649, wherein the second surface is eliminated from the vent opening feature 646.

Figure 41D:
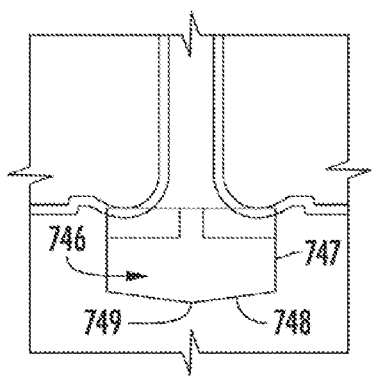
Figure 41E:
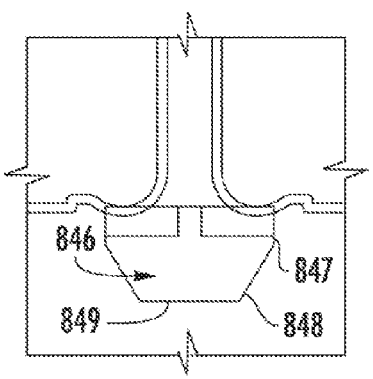

Referring now to FIG. 41D, the vent opening feature 746 is provided having a relatively long first surface 747 and a relatively small angle second surface 748 that creates a bottom point 749. However, according to another exemplary embodiment, as shown in FIG. 41E, a vent opening feature 846 has a short first surface 847 with a more steeply sloped second surface 848, creating a relatively long bottom surface 849.

Figure 41F:
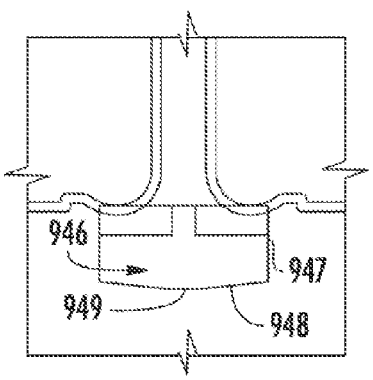
Figure 41G:
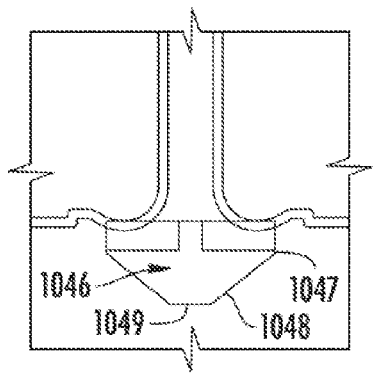

Referring now to FIG. 41F, according to an exemplary embodiment, the vent opening feature 946 may have a relatively longer first surface 947 and a relatively flatter second surface 948 creating a short bottom surface 949. According to another exemplary embodiment, as shown in FIG. 41G, a vent opening feature 1046 may have a short first surface 1047 and a relatively steep second surface 1048, creating a relatively short bottom surface 1049. However, according to other various exemplary embodiments, the vent opening feature as shown in any of FIGS. 41A-41G may vary in size and/or shape according to various exemplary embodiments.

According to an exemplary embodiment, a battery module includes a plurality of electrochemical cells provided in a tray or structure. Each of the plurality of cells includes a vent feature on one end thereof. The vent feature of the cell is located in a chamber formed by the tray. The chamber is configured to contain any gases and/or effluent that is vented from the cells via the vent feature. A seal is used to seal the gap between the cells and the tray in order to prevent any gases and/or effluent from escaping the chamber.

According to an exemplary embodiment, a battery module includes a plurality of electrochemical cells provided in a first structure. The first structure has a plurality of sockets configured to receive the plurality of electrochemical cells. The plurality of sockets position a lower end of each of the plurality of electrochemical cells above a chamber formed by the first structure. The lower end of each of the plurality of electrochemical cells includes a vent device configured to allow gases to vent from the cell into the chamber. The battery module further includes a member configured to seal the space between the electrochemical cells and the first structure so that the vented gases are confined within the chamber.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the seal for battery module vent chamber as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A battery module having a sealed vent chamber, the battery module comprising:
   a plurality of electrochemical cells each having a housing, a vent configured to deploy from a first end of the housing, and a seal fixed to the housing proximate the first end of the housing; and
   a structure defining a chamber and comprising a plurality of sockets, wherein each socket is configured to receive one of the plurality of electrochemical cells such that the vent of each of the electrochemical cells is located in the chamber and such that the seal of each of the electrochemical cells seals against the respective socket, wherein the seals are configured to seal gases vented into the chamber from escaping the chamber.

2. The battery module of claim 1, wherein the seal comprises an enlarged portion provided adjacent a perimeter of the seal.

3. The battery module of claim 1, wherein the seals are made from an injection molded silicone.

4. The battery module of claim 1, wherein the seals are die cut from a silicone material.

5. The battery module of claim 1, further comprising a vent opening feature provided concentrically around the vents of each of the electrochemical cells, the vent opening feature configured to aid in the full deployment of the vent.

6. The battery module of claim 5, wherein the vent opening feature comprises a first surface substantially parallel to the direction of the intended deployment of the vent.

7. The battery module of claim 6, wherein a vertical height of the first surface is such that a pressure drop is created between an electrochemical cell and the chamber when only a portion of the vent deploys from the electrochemical cell.

8. The battery module of claim 7, wherein the vent opening feature further comprises a second surface provided at an angle to the first surface.

9. The battery module of claim 8, wherein the second surface is configured to allow a gradual decrease of the pressure drop once the vent is fully deployed from the electrochemical cell.

10. A battery system for use in a vehicle, the battery system comprising:
   a plurality of battery modules, each module comprising a plurality of electrochemical cells that each include a casing, a vent configured to deploy from a first end of the casing, and a seal fixed to the casing proximate the first end of the casing; and
   at least one structure defining at least one chamber and comprising a plurality of sockets, wherein each socket is configured to receive one of the plurality of electrochemical cells such that the vent of each of the electrochemical cells is located in the chamber and such that the seal of each of the electrochemical cells seals against the respective socket, wherein the seals are configured to seal gases vented into the chamber from escaping the chamber.

11. The battery system of claim 10, further comprising a housing to enclose at least a portion of the electrochemical cells.

12. The battery system of claim 10, further comprising a connector for electrically connecting the battery system to the vehicle.

13. The battery system of claim 10, further comprising a disconnect device to allow for at least one battery module to electrically disconnect from the battery system to reduce the voltage potential of the battery system.

14. The battery system of claim 10, further comprising a controller that includes a circuit for monitoring and regulating the plurality of electrochemical cells.

15. The battery system of claim 14, wherein the controller monitors and regulates the temperature of the plurality of electrochemical cells.

16. The battery system of claim 14, wherein the controller monitors and regulates the voltage of the plurality of electrochemical cells.

17. The battery system of claim 10, further comprising a clamping plate provided above the plurality of seals that secures and compresses the plurality of seals into tighter engagement with the at least one structure comprising the plurality of sockets.

18. A battery module, comprising:
   a structure defining a chamber and comprising a plurality of sockets; and
   a plurality of electrochemical cells, wherein each electrochemical cell is provided in one associated socket of the structure, wherein each electrochemical cell includes a casing, a vent configured to deploy from a first end of the casing into the chamber, and a seal fixed to the casing proximate the first end of the casing, and wherein each of the seals is configured to seal gases vented into the chamber from escaping the chamber through the plurality of sockets.

19. The battery system of claim 18, wherein the cell further includes a plurality of projections configured to engage a plurality of corresponding openings in the socket.

20. The battery system of claim 18, wherein the vent deploys when the pressure within the cell reaches a threshold pressure.

21. The battery system of claim 18, wherein the vent deploys when the temperature within the cell reaches a threshold temperature.

22. The battery module of claim 1, wherein at least one of the plurality of electrochemical cells is a cylindrical cell.

23. The battery module of claim 1, wherein at least one of the plurality of electrochemical cells is a prismatic cell.

24. The battery system of claim 10, wherein at least one of the plurality of electrochemical cells is a cylindrical cell, a prismatic cell, or a polygonal cell.

25. The battery module of claim 18, wherein at least one of the plurality of electrochemical cells is a cylindrical cell, a prismatic cell, or a polygonal cell.

\* \* \* \* \*